(12) United States Patent
Wagner et al.

(10) Patent No.: US 12,153,994 B2
(45) Date of Patent: Nov. 26, 2024

(54) SYSTEMS AND METHODS FOR PROCESSING OBJECTS INCLUDING SPACE EFFICIENT DISTRIBUTION STATIONS AND AUTOMATED OUTPUT PROCESSING

(71) Applicant: Berkshire Grey Operating Company, Inc., Bedford, MA (US)

(72) Inventors: Thomas Wagner, Concord, MA (US); Kevin Ahearn, Nebo, NC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Victoria Hinchey, Winchester, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

(21) Appl. No.: 18/376,939

(22) Filed: Oct. 5, 2023

(65) Prior Publication Data
US 2024/0037353 A1   Feb. 1, 2024

Related U.S. Application Data

(63) Continuation of application No. 17/395,180, filed on Aug. 5, 2021, now Pat. No. 11,842,248, which is a
(Continued)

(51) Int. Cl.
*G06K 7/10* (2006.01)
*B07C 5/34* (2006.01)
(Continued)

(52) U.S. Cl.
CPC ........ *G06K 7/10693* (2013.01); *B07C 5/3412* (2013.01); *B65G 1/1378* (2013.01);
(Continued)

(58) Field of Classification Search
CPC .............. G06K 7/10693; B07C 5/3412; B65G 1/1378; B65G 25/04
(Continued)

(56) References Cited

U.S. PATENT DOCUMENTS

| | | |
|---|---|---|
| 3,592,326 A | 7/1971 | Zimmerle et al. |
| 3,595,407 A | 7/1971 | Muller-Kuhn et al. |

(Continued)

FOREIGN PATENT DOCUMENTS

| | | |
|---|---|---|
| AU | 2006204622 A1 | 3/2007 |
| CN | 1033604 A | 7/1989 |

(Continued)

OTHER PUBLICATIONS

Non-Final Office Action issued by the United States Patent and Trademark Office in related U.S. Appl. No. 18/382,452 on May 2, 2024, 12 pages.
(Continued)

*Primary Examiner* — Ahshik Kim
(74) *Attorney, Agent, or Firm* — Gesmer Updegrove LLP

(57) ABSTRACT

A space efficient automated processing system for processing objects is disclosed. The processing system includes an
(Continued)

input conveyance system for moving objects from an input area in at least an input conveyance vector that includes an input conveyance horizontal direction component and an input conveyance vertical direction component, a perception system for receiving objects from the input conveyance system and for providing perception data regarding an object, a primary transport system for receiving the object from the perception system and for providing transport of the object along at least a primary transport vector including an primary transport horizontal component and a primary transport vertical component that is generally opposite the input conveyance horizontal direction component, and at least two secondary transport systems, each of which receives the object from the primary transport system and moves the object in either of reciprocal directions.

30 Claims, 24 Drawing Sheets

Related U.S. Application Data continuation of application No. 16/867,127, filed on May 5, 2020, now Pat. No. 11,126,807, which is a continuation of application No. 16/543,105, filed on Aug. 16, 2019, now Pat. No. 10,796,116, which is a continuation of application No. 15/956,442, filed on Apr. 18, 2018, now Pat. No. 10,438,034.

(60) Provisional application No. 62/486,783, filed on Apr. 18, 2017.

(51) Int. Cl.
| | |
|---|---|
| B65G 1/137 | (2006.01) |
| B65G 25/04 | (2006.01) |
| B65G 47/12 | (2006.01) |
| B65G 47/18 | (2006.01) |
| B65G 47/46 | (2006.01) |
| B65G 47/96 | (2006.01) |

(52) U.S. Cl.
CPC .............. *B65G 25/04* (2013.01); *B65G 47/12* (2013.01); *B65G 47/18* (2013.01); *B65G 47/46* (2013.01); *B65G 47/962* (2013.01); *B65G 2203/041* (2013.01)

(58) Field of Classification Search
USPC ........................................................ 235/470
See application file for complete search history.

(56) References Cited

U.S. PATENT DOCUMENTS

| | | |
|---|---|---|
| 3,734,286 A | 5/1973 | Simjian |
| 3,983,988 A | 10/1976 | Maxted et al. |
| 4,136,780 A | 1/1979 | Hunter et al. |
| 4,186,836 A | 2/1980 | Wassmer et al. |
| 4,360,098 A | 11/1982 | Nordstrom |
| 4,560,060 A | 12/1985 | Lenhart |
| 4,622,875 A | 11/1986 | Emery et al. |
| 4,722,653 A | 2/1988 | Williams et al. |
| 4,759,439 A | 7/1988 | Hartlepp |
| 4,819,784 A | 4/1989 | Sticht |
| 4,846,335 A | 7/1989 | Hartlepp |
| 4,895,242 A | 1/1990 | Michel |
| 5,119,306 A | 6/1992 | Metelits et al. |
| 5,190,162 A | 3/1993 | Hartlepp |
| 5,326,219 A | 7/1994 | Pippin et al. |
| 5,419,457 A | 5/1995 | Ross et al. |
| 5,460,271 A | 10/1995 | Kenny et al. |
| 5,585,917 A | 12/1996 | Woite et al. |
| 5,672,039 A | 9/1997 | Perry et al. |
| 5,713,473 A | 2/1998 | Satake et al. |
| 5,794,788 A | 8/1998 | Massen |
| 5,794,789 A | 8/1998 | Payson et al. |
| 5,806,661 A | 9/1998 | Martin et al. |
| 5,839,566 A | 11/1998 | Bonnet |
| 5,875,434 A | 2/1999 | Matsuoka et al. |
| 5,990,437 A | 11/1999 | Coutant et al. |
| 6,060,677 A | 5/2000 | Ulrichsen et al. |
| 6,124,560 A | 9/2000 | Roos et al. |
| 6,246,023 B1 | 6/2001 | Kugle |
| 6,311,892 B1 | 11/2001 | O'Callaghan et al. |
| 6,323,452 B1 | 11/2001 | Bonnet |
| 6,401,936 B1 | 6/2002 | Isaacs et al. |
| 6,688,459 B1 | 2/2004 | Bonham et al. |
| 6,762,382 B1 | 7/2004 | Danelski |
| 6,897,395 B2 | 5/2005 | Shiibashi et al. |
| 7,306,086 B2 | 12/2007 | Boelaars |
| 8,560,406 B1 | 10/2013 | Antony |
| 8,731,711 B1 | 5/2014 | Joplin et al. |
| 8,776,694 B2 | 7/2014 | Rosenwinkel et al. |
| 8,997,438 B1 | 4/2015 | Fallas |
| 9,020,632 B2 | 4/2015 | Naylor |
| 9,102,336 B2 | 8/2015 | Rosenwinkel |
| 9,174,758 B1 | 11/2015 | Rowley et al. |
| 9,364,865 B2 | 6/2016 | Kim |
| 9,650,214 B2 | 5/2017 | Hoganson |
| 9,751,693 B1 | 9/2017 | Battles et al. |
| 9,878,349 B2 | 1/2018 | Crest et al. |
| 9,926,138 B1 | 3/2018 | Brazeau et al. |
| 9,931,673 B2 | 4/2018 | Nice et al. |
| 9,962,743 B2 | 5/2018 | Bombaugh et al. |
| 9,975,148 B2 | 5/2018 | Zhu et al. |
| 10,029,865 B1 | 7/2018 | McCalib, Jr. et al. |
| 10,198,710 B1 | 2/2019 | Hahn et al. |
| 10,206,519 B1 | 2/2019 | Gyori et al. |
| 10,438,034 B2 | 10/2019 | Wagner et al. |
| 10,538,394 B2 | 1/2020 | Wagner et al. |
| 10,576,621 B2 | 3/2020 | Wagner et al. |
| 10,577,180 B1 | 3/2020 | Mehta et al. |
| 10,611,021 B2 | 4/2020 | Wagner et al. |
| 10,809,122 B1 | 10/2020 | Danenberg et al. |
| 10,810,715 B2 | 10/2020 | Chamberlin |
| 10,853,757 B1 | 12/2020 | Hill et al. |
| 11,055,504 B2 | 7/2021 | Wagner et al. |
| 11,080,496 B2 | 8/2021 | Wagner et al. |
| 11,126,807 B2 | 9/2021 | Wagner et al. |
| 11,200,390 B2 | 12/2021 | Wagner et al. |
| 11,205,059 B2 | 12/2021 | Wagner et al. |
| 11,416,695 B2 | 8/2022 | Wagner et al. |
| 11,481,566 B2 | 10/2022 | Wagner et al. |
| 11,537,807 B2 | 12/2022 | Wagner et al. |
| 11,681,884 B2 | 6/2023 | Wagner et al. |
| 11,734,526 B2 | 8/2023 | Wagner et al. |
| 11,842,248 B2 * | 12/2023 | Wagner ............... B65G 1/1378 |
| 11,847,513 B2 | 12/2023 | Wagner et al. |
| 2002/0092801 A1 | 7/2002 | Dominguez |
| 2002/0134056 A1 | 9/2002 | Dimario et al. |
| 2002/0157919 A1 | 10/2002 | Sherwin |
| 2002/0170850 A1 | 11/2002 | Bonham et al. |
| 2002/0179502 A1 | 12/2002 | Cerutti et al. |
| 2003/0034281 A1 | 2/2003 | Kumar |
| 2003/0038065 A1 | 2/2003 | Pippin et al. |
| 2003/0075051 A1 | 4/2003 | Watanabe et al. |
| 2004/0065597 A1 | 4/2004 | Hanson |
| 2004/0118907 A1 | 6/2004 | Rosenbaum et al. |
| 2004/0194428 A1 | 10/2004 | Close et al. |
| 2004/0195320 A1 | 10/2004 | Ramsager |
| 2004/0215480 A1 | 10/2004 | Kadaba |
| 2004/0261366 A1 | 12/2004 | Gillet et al. |
| 2005/0002772 A1 | 1/2005 | Stone |
| 2005/0149226 A1 | 7/2005 | Stevens et al. |
| 2005/0220600 A1 | 10/2005 | Baker et al. |
| 2006/0021858 A1 | 2/2006 | Sherwood |
| 2006/0070929 A1 | 4/2006 | Fry et al. |
| 2007/0209976 A1 | 9/2007 | Worth et al. |
| 2008/0046116 A1 | 2/2008 | Khan et al. |
| 2008/0181753 A1 | 7/2008 | Bastian et al. |
| 2008/0193272 A1 | 8/2008 | Beller |

(56) References Cited

U.S. PATENT DOCUMENTS

| | | |
|---|---|---|
| 2009/0026017 A1 | 1/2009 | Freudelsperger |
| 2010/0122942 A1 | 5/2010 | Harres et al. |
| 2010/0318216 A1 | 12/2010 | Faivre et al. |
| 2011/0084003 A1 | 4/2011 | Benjamins |
| 2011/0130868 A1 | 6/2011 | Baumann |
| 2011/0144798 A1 | 6/2011 | Freudelsperger |
| 2011/0238207 A1 | 9/2011 | Bastian, II et al. |
| 2011/0243707 A1 | 10/2011 | Dumas et al. |
| 2011/0320036 A1 | 12/2011 | Freudelsperger |
| 2012/0096818 A1 | 4/2012 | Pippin |
| 2012/0118699 A1 | 5/2012 | Buchman et al. |
| 2012/0125735 A1 | 5/2012 | Schuitema et al. |
| 2012/0293623 A1 | 11/2012 | Nygaard |
| 2013/0001139 A1 | 1/2013 | Tanner |
| 2013/0051696 A1 | 2/2013 | Garrett et al. |
| 2013/0104664 A1 | 5/2013 | Chevalier, Jr. et al. |
| 2013/0110280 A1 | 5/2013 | Folk |
| 2013/0202195 A1 | 8/2013 | Perez Cortes et al. |
| 2014/0244026 A1 | 8/2014 | Neiser |
| 2014/0249666 A1 | 9/2014 | Radwallner et al. |
| 2014/0277693 A1 | 9/2014 | Naylor |
| 2014/0291112 A1 | 10/2014 | Lyon et al. |
| 2015/0068866 A1 | 3/2015 | Fourney |
| 2015/0098775 A1 | 4/2015 | Razumov |
| 2015/0114799 A1 | 4/2015 | Hansl et al. |
| 2016/0042320 A1 | 2/2016 | Dearing et al. |
| 2016/0083196 A1 | 3/2016 | Dugat |
| 2016/0221762 A1 | 8/2016 | Schroader |
| 2016/0221766 A1 | 8/2016 | Schroader et al. |
| 2016/0228921 A1 | 8/2016 | Doublet et al. |
| 2017/0057756 A1 | 3/2017 | Dugat et al. |
| 2017/0108577 A1 | 4/2017 | Loverich et al. |
| 2017/0121113 A1 | 5/2017 | Wagner et al. |
| 2017/0157649 A1 | 6/2017 | Wagner et al. |
| 2017/0197233 A1 | 7/2017 | Bombaugh et al. |
| 2017/0225330 A1 | 8/2017 | Wagner et al. |
| 2017/0243158 A1 | 8/2017 | Gupta et al. |
| 2017/0312789 A1 | 11/2017 | Schroader |
| 2017/0330135 A1 | 11/2017 | Taylor et al. |
| 2017/0349385 A1 | 12/2017 | Moroni et al. |
| 2017/0369244 A1 | 12/2017 | Battles et al. |
| 2018/0001353 A1 | 1/2018 | Stockard et al. |
| 2018/0044120 A1 | 2/2018 | Mäder |
| 2018/0065156 A1 | 3/2018 | Winkle et al. |
| 2018/0068266 A1 | 3/2018 | Kirmani et al. |
| 2018/0085788 A1 | 3/2018 | Engel et al. |
| 2018/0105363 A1 | 4/2018 | Lisso et al. |
| 2018/0127219 A1 | 5/2018 | Wagner et al. |
| 2018/0186572 A1 | 7/2018 | Issing |
| 2018/0224837 A1 | 8/2018 | Enssle |
| 2018/0265291 A1 | 9/2018 | Wagner et al. |
| 2018/0265298 A1 | 9/2018 | Wagner et al. |
| 2018/0265311 A1 | 9/2018 | Wagner et al. |
| 2018/0273295 A1 | 9/2018 | Wagner et al. |
| 2018/0273296 A1 | 9/2018 | Wagner et al. |
| 2018/0273297 A1 | 9/2018 | Wagner et al. |
| 2018/0273298 A1 | 9/2018 | Wagner et al. |
| 2018/0282065 A1 | 10/2018 | Wagner et al. |
| 2018/0282066 A1 | 10/2018 | Wagner et al. |
| 2018/0312336 A1 | 11/2018 | Wagner et al. |
| 2018/0327198 A1 | 11/2018 | Wagner et al. |
| 2018/0330134 A1 | 11/2018 | Wagner et al. |
| 2019/0022702 A1 | 1/2019 | Vegh et al. |
| 2019/0030712 A1 | 1/2019 | Sciog et al. |
| 2019/0091730 A1 | 3/2019 | Torang |
| 2019/0337723 A1 | 11/2019 | Wagner et al. |
| 2020/0023410 A1 | 1/2020 | Tamura et al. |
| 2020/0143127 A1 | 5/2020 | Wagner et al. |
| 2020/0319627 A1 | 10/2020 | Edwards et al. |
| 2020/0363259 A1 | 11/2020 | Bergstra et al. |
| 2021/0214163 A1 | 7/2021 | Deacon et al. |
| 2022/0198164 A1 | 6/2022 | Wagner et al. |
| 2022/0261738 A1 | 8/2022 | Kumar et al. |
| 2022/0276088 A1 | 9/2022 | Bergstra et al. |
| 2022/0314440 A1 | 10/2022 | Mizoguchi et al. |
| 2023/0077893 A1 | 3/2023 | Gebhardt et al. |
| 2023/0219767 A1 | 7/2023 | Demir et al. |
| 2023/0334275 A1 | 10/2023 | Wagner et al. |
| 2023/0342573 A1 | 10/2023 | Wagner et al. |
| 2023/0401398 A1 | 12/2023 | Wagner et al. |
| 2024/0054302 A1 | 2/2024 | Wagner et al. |
| 2024/0054303 A1 | 2/2024 | Wagner et al. |

FOREIGN PATENT DOCUMENTS

| | | |
|---|---|---|
| CN | 1643731 A | 7/2005 |
| CN | 1671489 A | 9/2005 |
| CN | 1783112 A | 6/2006 |
| CN | 1809428 A | 7/2006 |
| CN | 102884539 A | 1/2013 |
| CN | 103129783 A | 6/2013 |
| CN | 103442998 A | 12/2013 |
| CN | 103842270 A | 6/2014 |
| CN | 104355032 A | 2/2015 |
| CN | 104507814 A | 4/2015 |
| CN | 104858150 A | 8/2015 |
| CN | 204837530 U | 12/2015 |
| CN | 105314417 A | 2/2016 |
| CN | 105383906 A | 3/2016 |
| CN | 105668255 A | 6/2016 |
| CN | 105761195 A | 7/2016 |
| CN | 105800323 A | 7/2016 |
| CN | 105855189 A | 8/2016 |
| CN | 105873838 A | 8/2016 |
| CN | 205500186 U | 8/2016 |
| CN | 106111551 A | 11/2016 |
| CN | 106169168 A | 11/2016 |
| CN | 106734076 A | 5/2017 |
| CN | 107430719 A | 12/2017 |
| CN | 107472815 A | 12/2017 |
| CN | 108136596 A | 6/2018 |
| CN | 108137232 A | 6/2018 |
| CN | 108290297 A | 7/2018 |
| CN | 108290685 A | 7/2018 |
| CN | 108351637 A | 7/2018 |
| CN | 108602630 A | 9/2018 |
| CN | 108604091 A | 9/2018 |
| CN | 207981651 U | 10/2018 |
| CN | 108778636 A | 11/2018 |
| CN | 108921241 A | 11/2018 |
| CN | 109181473 A | 1/2019 |
| CN | 208304180 U | 1/2019 |
| DE | 19510392 A1 | 9/1996 |
| DE | 102004001181 A1 | 8/2005 |
| DE | 102007023909 A1 | 11/2008 |
| DE | 102007038834 A1 | 2/2009 |
| DE | 102008039764 A1 | 5/2010 |
| EP | 0235488 A1 | 9/1987 |
| EP | 0613841 A1 | 9/1994 |
| EP | 0648695 A2 | 4/1995 |
| EP | 1695927 A2 | 8/2006 |
| EP | 1995192 A2 | 11/2008 |
| EP | 2233400 A1 | 9/2010 |
| EP | 2477914 B1 | 4/2013 |
| EP | 2995567 A1 | 3/2016 |
| EP | 3112295 A1 | 1/2017 |
| FR | 2832654 A1 | 5/2003 |
| GB | 2084531 A | 4/1982 |
| JP | H0985181 A | 3/1997 |
| JP | 200228577 A | 1/2002 |
| JP | 2007182286 A | 7/2007 |
| JP | 2008037567 A | 2/2008 |
| JP | 4150106 B2 | 9/2008 |
| JP | 2010202291 A | 9/2010 |
| WO | 9731843 A1 | 9/1997 |
| WO | 03095339 A1 | 11/2003 |
| WO | 2005118436 A1 | 12/2005 |
| WO | 2007009136 A1 | 1/2007 |
| WO | 2008091733 A2 | 7/2008 |
| WO | 2010017872 A1 | 2/2010 |
| WO | 2011038442 A2 | 4/2011 |
| WO | 2014130937 A1 | 8/2014 |
| WO | 2015118171 A1 | 8/2015 |
| WO | 2016012742 A1 | 1/2016 |

(56) References Cited

FOREIGN PATENT DOCUMENTS

| WO | 2017036780 A1 | 3/2017 |
|----|---------------|--------|
| WO | 2017044747 A1 | 3/2017 |
| WO | 2017192783 A1 | 11/2017 |
| WO | 2018175466 A1 | 9/2018 |
| WO | 2018176033 A1 | 9/2018 |

OTHER PUBLICATIONS

Chao et al., Design and test of vacuum suction device for egg embryo activity sorting robot, Transactions of the Chinese Society of Agricultural Engineering, vol. 16, pp. 276-283, Aug. 23, 2017.
Examiner's Report issued by Innovation, Science and Economic Devleopment Canada (Canadian Intellectual Property Office) in related Canadian Patent Application No. 3,126,277 on Feb. 1, 2024, 3 pages.
Final Office Action issued by the U.S. Patent and Trademark Office in related U.S. Appl. No. 17/670,324 on Dec. 26, 2023, 8 pages.
Non-Final Office Action issued by the United States Patent and Trademark Office in related U.S. Appl. No. 18/202,697 on Jan. 3, 2024, 11 pages.
Non-Final Office Action issued by the United States Patent and Trademark Office in related U.S. Appl. No. 17/739,738 on Feb. 12, 2024, 12 pages.
Non-Final Office Action issued by the United States Patent and Trademark Office in related U.S. Appl. No. 18/221,671 on Mar. 12, 2024, 11 pages.
Notice on First Office Action issued by the China Naitonal Intellectual Property Administration in related Chinese Patent Application No. 202080008300.8 on Nov. 17, 2023, 20 pages.
Notice on First Office Action issued by the China Naitonal Intellectual Property Administration in related Chinese Patent Application No. 202080008348.9 on Nov. 14, 2023, 18 pages.
Notice on First Office Action issued by the China National Intellectual Property Administration in related Chinese Patent Application No. 202080008352.5 on Nov. 15, 2023, 23 pages.
Notice on First Office Action, along with its English translation, issued by the China National Intellectual Property Administration issued in related Chinese Patent Application No. 201980070400.0 on Nov. 9, 2023, 22 pages.
Notice on First Office Action, along with its English translation, issued by the China national Intellectual Property Administration in related Chinese Patent Application No. 202080008322.4 on Nov. 13, 2023, 21 pages.
Notice on the First Office Action, along with its English translation, issued by the China National Intellectual Property Administration in related Chinese Patent Application No. 202080008347.4 on Nov. 21, 2023, 19 pages.
Communication pursuant to Rules 161(1) and 162 EPC issued by the European Patent Office in related European Patent Application No. 18723144.4 on Nov. 26, 2019, 3 pages.
Communication pursuant to Rules 161(1) and 162 EPC issued by the European Patent Office in related European Application No. 19805436.3 on Jun. 1, 2021, 3 pages.
Communication pursuant to Rules 161(1) and 162EPC issued by the European Patent Office in related European Patent Application No. 20704961.0 on Aug. 17, 2021, 3 pages.
Communication pursuant to Rules 161(1) and 162EPC issued by the European Patent Office in related European Patent Application No. 20703621.1 on Aug. 17, 2021, 3 pages.
Communication pursuant to Rules 161(1) and 162EPC issued by the European Patent Office in related European Patent Application No. 20704119.5 on Aug. 17, 2021, 3 pages.
Communication pursuant to Rules 161(1) and 162EPC issued by the European Patent Office in related European Patent Application No. 20704962.8 on Aug. 17, 2021, 3 pages.
Communication pursuant to Rules 161(1) and 162EPC issued by the European Patent Office in related European Patent Application No. 20704645.9 on Aug. 17, 2021, 3 pages.
Communication pursuant to Rules 161(1) and 162EPC issued by the European Patent Office in related European Patent Application No. 20703866.2 on Aug. 17, 2021, 3 pages.
Examiner's Report issued by the Innovation, Science and Economic Development Canada in related Canadian Patent Application No. 3,060,257 on Dec. 9, 2020, 3 pages.
Examiner's Report issued by the Innovation, Science and Economic Development Canada (Canadian Intellectual Property Office) in related Canadian Patent Application No. 3,060,257 on Oct. 28, 2021, 6 pages.
Examiner's Report issued by the Innovation, Science and Economic Development Canada (Canadian Intellectual Property Office) in related Canadian Patent Application No. 3,126,766 on Apr. 13, 2022, 5 pages.
Examiner's Report issued by the Innovation, Science and Economic Development Canada (Canadian Intellectual Property Office) in related Canadian Patent Application No. 3,126,277 on Sep. 12, 2022, 4 pages.
Examiner's Report issued by the Innovation, Science and Economic Development Canada (Canadian Intellectual Property Office) in related Canadian Patent Application No. 3,126,160 on Sep. 21, 2022, 4 pages.
Examiner's Report issued by the Innovation, Science and Economic Development Canada (Canadian Intellectual Property Office) in related Canadian Patent Application No. 3,126,161 on Sep. 21, 2022, 4 pages.
Examiner's Report issued by the Innovation, Science and Economic Development Canada (Canadian Intellectual Property Office) in related Canadian Patent Application No. 3,126,258 on Sep. 12, 2022, 5 pages.
Examiner's Report issued by the Innovation, Science and Economic Development Canada (Canadian Intellectual Property Office) in related Canadian Patent Application No. 3,126,276 on Sep. 13, 2022, 5 pages.
Examiner's Report issued by the Innovation, Science and Economic Development Canada (Canadian Intellectual Property Office) in related Canadian Patent Application No. 3,126,138 on Oct. 26, 2022, 7 pages.
Examiner's Report issued by the Innovation, Science and Economic Development Canada (Canadian Intellectual Property Office) in related Canadian Application No. 3,152,708 on May 3, 2023, 7 pages.
Examiner's Report issued by the Innovation, Science and Economic Development Canada (Canadian Intellectual Property Office) in related Canadian Application No. 3,126,161 on Jul. 28, 2023, 3 pages.
Examiner's Report issued by the Innovation, Science and Economic Development Canada (Canadian Intellectual Property Office) in related Canadian Patent Application No. 3,126,160 on Aug. 3, 2023, 4 pages.
Final Office Action issued by the U.S. Patent and Trademark Office in related U.S. Appl. No. 16/737,213 on Jul. 23, 2021, 10 pages.
International Preliminary Report on Patentability issued by the International Bureau of WIPO on Oct. 22, 2019, in related International Application No. PCT/US2018/028164, 11 pages.
International Preliminary Report on Patentability issued by the International Bureau of WIPO in related International Application No. PCT/US2019/057710 on Apr. 27, 2021, 8 pages.
International Preliminary Report on Patentability issued by the International Bureau of WIPO in related International Application No. PCT/US2020/012744 on Jun. 16, 2021, 8 pages.
International Preliminary Report on Patentability issued by the International Bureau of WIPO in related International Application No. PCT/US2020/012720 on Jun. 16, 2021, 8 pages.
International Preliminary Report on Patentability issued by the International Bureau of WIPO in related International Application No. PCT/US2020/012695 on Jun. 16, 2021, 8 pages.
International Preliminary Report on Patentability issued by the International Bureau of WIPO in related International Application No. PCT/US2020/012713 on Jun. 16, 2021, 8 pages.
International Preliminary Report on Patentability issued by the International Bureau of WIPO in related International Application No. PCT/US2020/012754 on Jun. 16, 2021, 8 pages.

(56) References Cited

OTHER PUBLICATIONS

International Preliminary Report on Patentability issued by the International Bureau of WIPO in related International Application No. PCT/US2020/012704 on Jun. 16, 2021, 9 pages.
International Search Report and Written Opinion issued by the International Searching Authority on Aug. 9, 2018, in related International Application No. PCT/US2018/028164, 15 pages.
International Search Report and Written Opinion issued by the International Searching Authority on Mar. 25, 2020, in related International Application No. PCT/US2020/012695, 14 pages.
International Search Report and Written Opinion issued by the International Searching Authority on Mar. 25, 2020, in related International Application No. PCT/US2020/012704, 15 pages.
International Search Report and Written Opinion issued by the International Searching Authority on Mar. 25, 2020, in related International Application No. PCT/US2020/012713, 14 pages.
International Search Report and Written Opinion issued by the International Searching Authority on Mar. 25, 2020, in related International Application No. PCT/US2020/012720, 14 pages.
International Search Report and Written Opinion issued by the International Searching Authority on Mar. 25, 2020, in related International Application No. PCT/US2020/012744, 14 pages.
International Search Report and Written Opinion issued by the International Searching Authority on Mar. 25, 2020, in related International Application No. PCT/US2020/012754, 14 pages.
International Search Report and Written Opinion issued by the International Searching Authority on Feb. 6, 2020 in related International Application No. PCT/US2019/057710, 12 pages.
Non-Final Office Action issued by the U.S. Patent and Trademark Office in related U.S. Appl. No. 15/956,442 on Mar. 15, 2019, 8 pages.
Non-Final Office Action issued by the U.S. Patent and Trademark Office in related U.S. Appl. No. 16/737,213 on Jun. 4, 2020, 6 pages.
Non-Final Office Action issued by the U.S. Patent and Trademark Office in related U.S. Appl. No. 16/737,211 on Nov. 23, 2020, 11 pages.
Non-Final Office Action issued by the U.S. Patent and Trademark Office in related U.S. Appl. No. 16/737,213 on Feb. 24, 2021, 8 pages.
Non-Final Office Action issued by the U.S. Patent and Trademark Office in related U.S. Appl. No. 16/737,218 on Mar. 26, 2021, 13 pages.
Non-Final Office Action issued by the U.S. Patent and Trademark Office in related U.S. Appl. No. 16/737,202 on Apr. 13, 2021, 9 pages.
Non-Final Office Action issued by the U.S. Patent and Trademark Office in related U.S. Appl. No. 16/737,218 on Oct. 26, 2021, 7 pages.
Non-Final Office Action issued by the U.S. Patent and Trademark Office in related U.S. Appl. No. 16/661,820 on Oct. 27, 2021, 18 pages.
Non-Final Office Action issued by the U.S. Patent and Trademark Office in related U.S. Appl. No. 16/737,215 on Mar. 26, 2021, 13 pages.
Non-Final Office Action issued by the United States Patent and Trademark Office in related U.S. Appl. No. 17/324,588 on Feb. 7, 2022, 10 pages.
Non-Final Office Action issued by the United States Patent and Trademark Office in related U.S. Appl. No. 17/349,064 on Mar. 8, 2022, 14 pages.
Non-Final Office Action issued by the United States Patent and Trademark Office in related U.S. Appl. No. 17/516,862 on Jul. 19, 2022, 10 pages.
Non-Final Office Action issued by the United States Patent and Trademark Office in related U.S. Appl. No. 17/395,180 on Nov. 30, 2022, 12 pages.
Non-Final Office Action issued by the United States Patent and Trademark Office in related U.S. Appl. No. 17/747,515 on Dec. 21, 2022, 10 pages.
Non-Final Office Action issued by the United States Patent and Trademark Office in related U.S. Appl. No. 17/508,217 on Jan. 4, 2023, 12 pages.
Non-Final Office Action issued by the United States Patent and Trademark Office in related U.S. Appl. No. 17/899,294 on Feb. 23, 2023, 10 pages.
Non-Final Office Action issued by the United States Patent and Trademark Office in related U.S. Appl. No. 17/982,287 on Mar. 22, 2023, 14 pages.
Non-Final Office Action issued by the United States Patent and Trademark Office in related U.S. Appl. No. 18/142,071 on Nov. 21, 2023, 11 pages.
Notice of First Office Action, along with its English translation, issued by the China National Intellectual Property Administration in related Chinese Patent Application No. 202080008346.X on Nov. 8, 2023, 15 pages.
Notice on the First Office Action and First Office Action, along with its English Translation, issued by the China National Intellectual Property Administration in related Chinese Patent Application No. 201880038892.0 on Sep. 2, 2020, 23 pages.
Notice on the First Office Action, and its English translation, issued in related Chinese Patent Application No. 202111245956.4 on Dec. 14, 2022, 16 pages.
Notice on the Second Office Action and Second Office Action, along with its English Translation, issued by the China National Intellectual Property Administration in related Chinese Patent Application No. 201880038892.0 on Apr. 14, 2021, 8 pages.

\* cited by examiner

SYSTEMS AND METHODS FOR PROCESSING OBJECTS INCLUDING SPACE EFFICIENT DISTRIBUTION STATIONS AND AUTOMATED OUTPUT PROCESSING

PRIORITY

The present application is a continuation of U.S. patent application Ser. No. 17/395,180, filed Aug. 5, 2021; which is a continuation of U.S. patent application Ser. No. 16/867,127, filed May 5, 2020, now U.S. Pat. No. 11,126,807, issued Sep. 21, 2021; which is a continuation of U.S. patent application Ser. No. 16/543,105, filed Aug. 16, 2019, now U.S. Pat. No. 10,796,116, issued Oct. 6, 2020; which is a continuation of U.S. patent application Ser. No. 15/956,442, filed Apr. 18, 2018, now U.S. Pat. No. 10,438,034, issued Oct. 8, 2019, which claims priority to U.S. Provisional Patent Application Ser. No. 62/486,783, filed Apr. 18, 2017, the disclosures of which are hereby incorporated by reference in their entireties.

BACKGROUND

The invention generally relates to automated, robotic and other processing systems, and relates in particular to automated and robotic systems intended for use in environments requiring, for example, that a variety of objects (e.g., articles, parcels or packages) be processed, e.g., sorted and/or otherwise distributed to several output destinations.

Many object distribution systems receive objects in a disorganized stream that may be provided as individual objects or objects aggregated in groups such as in bags, arriving on any of several different conveyances, commonly a conveyor, a truck, a pallet, a Gaylord, or a bin. Each object must then be distributed to the correct destination container, as determined by identification information associated with the object, which is commonly determined by a label printed on the object. The destination container may take many forms, such as a bag or a bin.

The processing of such objects has traditionally been done, at least in part, by human workers that scan the objects, e.g., with a hand-held barcode scanner, and then place the objects at assigned locations. For example many order fulfillment operations achieve high efficiency by employing a process called wave picking. In wave picking, orders are picked from warehouse shelves and placed at locations (e.g., into bins) containing multiple orders that are sorted downstream. At the processing stage individual objects are identified, and multi-object orders are consolidated, for example into a single bin or shelf location, so that they may be packed and then shipped to customers. The processing (e.g., sorting) of these objects has traditionally been done by hand. A human sorter picks an object from an incoming bin, finds a barcode on the object, scans the barcode with a handheld barcode scanner, determines from the scanned barcode the appropriate bin or shelf location for the article, and then places the article in the so-determined bin or shelf location where all objects for that order have been defined to belong. Automated systems for order fulfillment have also been proposed. See for example, U.S. Patent Application Publication No. 2014/0244026, which discloses the use of a robotic arm together with an arcuate structure that is movable to within reach of the robotic arm.

Other ways of identifying objects by code scanning either require manual processing, or require that the code location be controlled or constrained so that a fixed or robot-held code scanner (e.g., barcode scanner) can reliably detect it.

Manually operated barcode scanners are generally either fixed or handheld systems. With fixed systems, such as those used at point-of-sale systems, the operator holds the object and places it in front of the scanner so that the barcode faces the scanning device's sensors, and the scanner, which scans continuously, decodes any barcodes that it can detect. If the object is not immediately detected, the person holding the object typically needs to vary the position or rotation of the object in front of the fixed scanner, so as to make the barcode more visible to the scanner. For handheld systems, the person operating the scanner looks for the barcode on the object, and then holds the scanner so that the object's barcode is visible to the scanner, and then presses a button on the handheld scanner to initiate a scan of the barcode.

Further, many current distribution center sorting systems generally assume an inflexible sequence of operations whereby a disorganized stream of input objects is first singulated into a single stream of isolated objects presented one at a time to a scanner that identifies the object. A conveyance element or elements (e.g., a conveyor, a tilt tray, or manually movable bins) transport the objects to the desired destination or further processing station, which may be a bin, a chute, a bag or a conveyor etc.

In conventional parcel sortation systems, human workers or automated systems typically retrieve objects in an arrival order, and sort each object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not always most efficient.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Other partially automated sortation systems involve the use of recirculating conveyors and tilt trays, where the tilt trays receive objects by human sortation (human induction), and each tilt tray moves past a scanner. Each object is then scanned and moved to a pre-defined location assigned to the object. The tray then tilts to drop the object into the location. Further, partially automated systems, such as the bomb-bay style recirculating conveyor, involve having trays open doors on the bottom of each tray at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; they then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not ID an object and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems don't address the limitations to total number of system bins. The system is simply diverting an equal share of the total objects to each parallel manual cell. Thus each parallel sortation cell must have all the same collection bins designations; otherwise an object might be delivered to a cell that does not have a bin to which that object is mapped. There remains a need for a more efficient and more cost effective object sortation system that sorts objects of a variety of sizes and weights into appropriate collection bins or trays of fixed sizes, yet is efficient in handling objects of such varying sizes and weights.

SUMMARY

In accordance with an embodiment, the invention provides a space efficient automated processing system for processing objects. The processing system includes an input conveyance system for moving objects from an input area in at least an input conveyance vector that includes an input conveyance horizontal direction component and an input conveyance vertical direction component, a perception system for receiving objects from the input conveyance system and for providing perception data regarding an object, a primary transport system for receiving the object from the perception system and for providing transport of the object along at least a primary transport vector including an primary transport horizontal component and a primary transport vertical component that is generally opposite the input conveyance horizontal direction component, and at least two secondary transport systems, each of which receives the object from the primary transport system and moves the object in either of reciprocal directions that are each generally parallel with the input conveyance horizontal direction component and the primary direction horizontal direction component.

In accordance with another embodiment, the invention provides a method for providing space efficient automated processing of objects. The method includes the steps of conveying objects on an input conveyance system from an input area in at least an input conveyance vector that includes an input conveyance horizontal direction component and an input conveyance vertical direction component, receiving objects from the input conveyance system and for providing perception data regarding an object responsive to the object falling in a perception system vertical direction that is generally opposite in direction to the input conveyance vertical direction component, transporting objects received from the perception system, and using a primary transport system, along at least a primary transport vector including a primary transport horizontal direction component and a primary transport vertical component that is generally opposite the input conveyance horizontal direction component, and receiving the object from the primary transport system, and moving the object in a direction that is generally parallel with the input conveyance horizontal direction component and the primary direction horizontal direction component.

In accordance with yet another embodiment, the invention provides an automated processing system for processing objects. The automated processing system includes an input conveyance system for moving objects from an input area toward a perception system, the perception system for receiving objects from the input conveyance system and for providing perception data regarding an object, a primary transport system for receiving the object from the perception system and for providing transport of the object along at least a primary transport vector, and a diverter system for providing the object to one of a plurality of processing locations, each processing location including a processing bin or box, wherein each of the processing bins or boxes is provided on at least one input bin conveyor system that is biased to urge the processing bins or boxes on the input conveyor system to one side of the input conveyor system.

In accordance with a further embodiment, the invention provides a method of processing objects. The method includes the steps of moving objects from an input area using an input conveyance system toward a perception system, receiving the objects from the input conveyance system and for providing perception data regarding an object using a primary perception system, receiving the object from the primary perception system and for providing transport of the object using a primary transport system along at least a primary transport vector, and diverting the object to one of a plurality of processing locations, each processing location including a processing bin or box, wherein each of the processing bins or boxes is provided on at least one input bin conveyor system that is biased to urge the processing bins or boxes toward one end of the input conveyor system

BRIEF DESCRIPTION OF THE DRAWINGS

The following description may be further understood with reference to the accompanying drawings in which.

Figure 1:
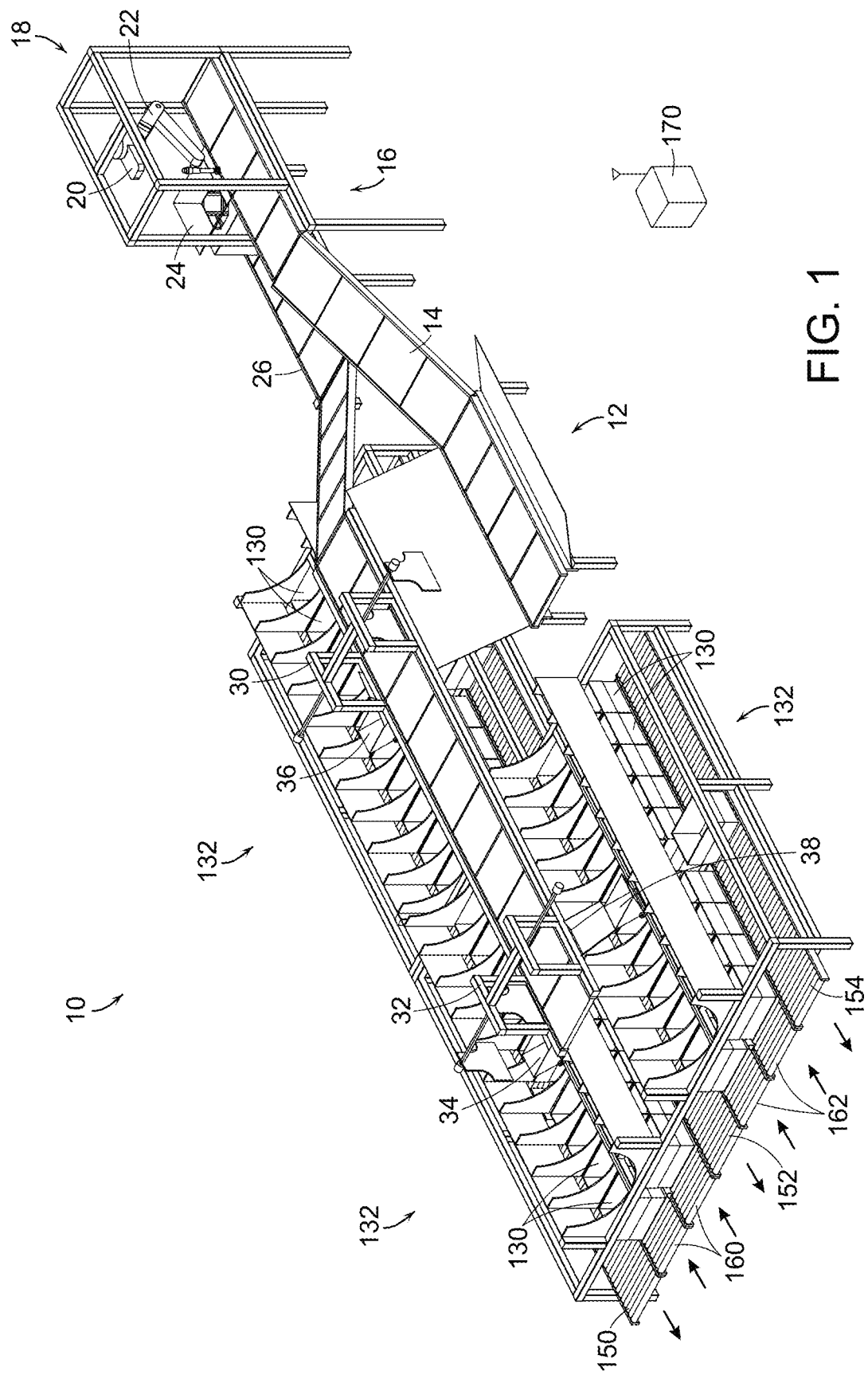
FIG. 1 shows an illustrative diagrammatic front view of an object processing system in accordance with an embodiment of the present invention.

The drawings are shown for illustrative purpose only.

DETAILED DESCRIPTION

In accordance with an embodiment, the invention provides a space efficient automated processing system for processing objects. The system includes an input conveyance system, a perception system, a primary transport system, and at least two secondary transport systems. The input conveyance system is for moving objects from an input area in at least an input conveyance vector that includes an input conveyance horizontal direction component and an input conveyance vertical direction component. The perception system is for receiving objects from the input conveyance system and for providing perception data regarding an object. The primary transport system is for receiving the object from the perception system and for providing transport of the object along at least a primary transport vector including a primary transport horizontal component and a primary transport vertical component that is generally opposite the input conveyance horizontal direction component. The at least two secondary transport systems each of which receive the object from the primary transport system and move the object in either of reciprocal directions that are each generally parallel with the input conveyance horizontal direction component and the primary direction horizontal direction component.

The described systems reliably automate the identification and conveyance of such objects, employing in certain embodiments, a set of conveyors and sensors and a robot arm. In short, applicants have discovered that when automating sortation of objects, there are a few main things to consider: 1) the overall system throughput (objects sorted per hour), 2) the number of diverts (i.e., number of discrete locations to which an object can be routed), 3) the total area of the sortation system (square feet), and 4) the annual costs to run the system (man-hours, electrical costs, cost of disposable components).

Processing objects in a distribution center (e.g., for example, sorting) is one application for automatically identifying and moving objects. In a shipping distribution center for example, objects commonly arrive in trucks, are conveyed to sortation stations where they are processed, e.g., sorted) according to desired destinations, aggregated in bags, and then loaded in trucks for transport to the desired destinations. Another application may be in the shipping department of a retail store or order fulfillment center, which may require that objects be processed for transport to different shippers, or to different distribution centers of a particular shipper. In a shipping or distribution center the objects may take form of plastic bags, boxes, tubes, envelopes, or any other suitable container, and in some cases may also include objects not in a container. In a shipping or distribution center the desired destination is commonly obtained by reading identifying information printed on the object or on an attached label. In this scenario the destination corresponding to identifying information is commonly obtained by querying the customer's information system. In other scenarios the destination may be written directly on the object, or may be known through other means.

In accordance with various embodiments, therefore, the invention provides a method of taking individual objects from a disorganized stream of objects, providing a generally singulated stream of objects, identifying individual objects, and processing them to desired destinations. The invention further provides methods for loading objects into the system, for conveying objects from one point to the next, for determining grasp locations and grasping objects, for excluding inappropriate or unidentifiable objects, for transferring objects from one conveyor to another, for aggregating objects and transferring to output conveyors, for digital communication within the system and with outside information systems, human operators and maintenance staff, and for maintaining a safe environment.

Important components of an automated object identification and processing system, in accordance with an embodiment of the present invention, include an input conveyance system, a perception system, a primary transport system, and secondary transport systems. FIG. 1 for example, shows a system 10 that includes an infeed area 12 into which objects may be dumped, e.g., by a dumper or transferred from a Gaylord. An infeed conveyor 14 conveys objects from the infeed area 12 to an intermediate conveyor 16 at a processing station 18. The infeed conveyor 14 may include cleats for assisting in lifting the objects from the input area 12 onto the intermediate conveyor 16.

The processing station 18 also includes a grasp perception system 20 that views the objects on the intermediate conveyor 16, and identifies grasp locations on the objects. The processing station 18 also includes a programmable motion device 22, such as an articulated arm, and a primary perception system 24 such as a drop perception unit. The grasp perception system 20 surveys the objects to identify objects when possible, and to determine good grasp points. The object is then grasped by the device 22, and dropped into the drop perception system 24 to ensure that the object is accurately identified. The object then falls through the primary perception system 24 onto a primary transport system 26, e.g., a conveyor. The primary transport system 26 carries the objects past one or more diverters 30, 32 that may be engaged to divert an object off of the primary transport system 26 into any of carriages (when the respective carriage is aligned with the diverter) 34, 36, 38 or the input area 12. Each of the carriages 34, 36, 38 is reciprocally movable along a track that runs between rows of destination stations 130 of shuttle sections 132 (as discussed below in more detail).

Figure 2:
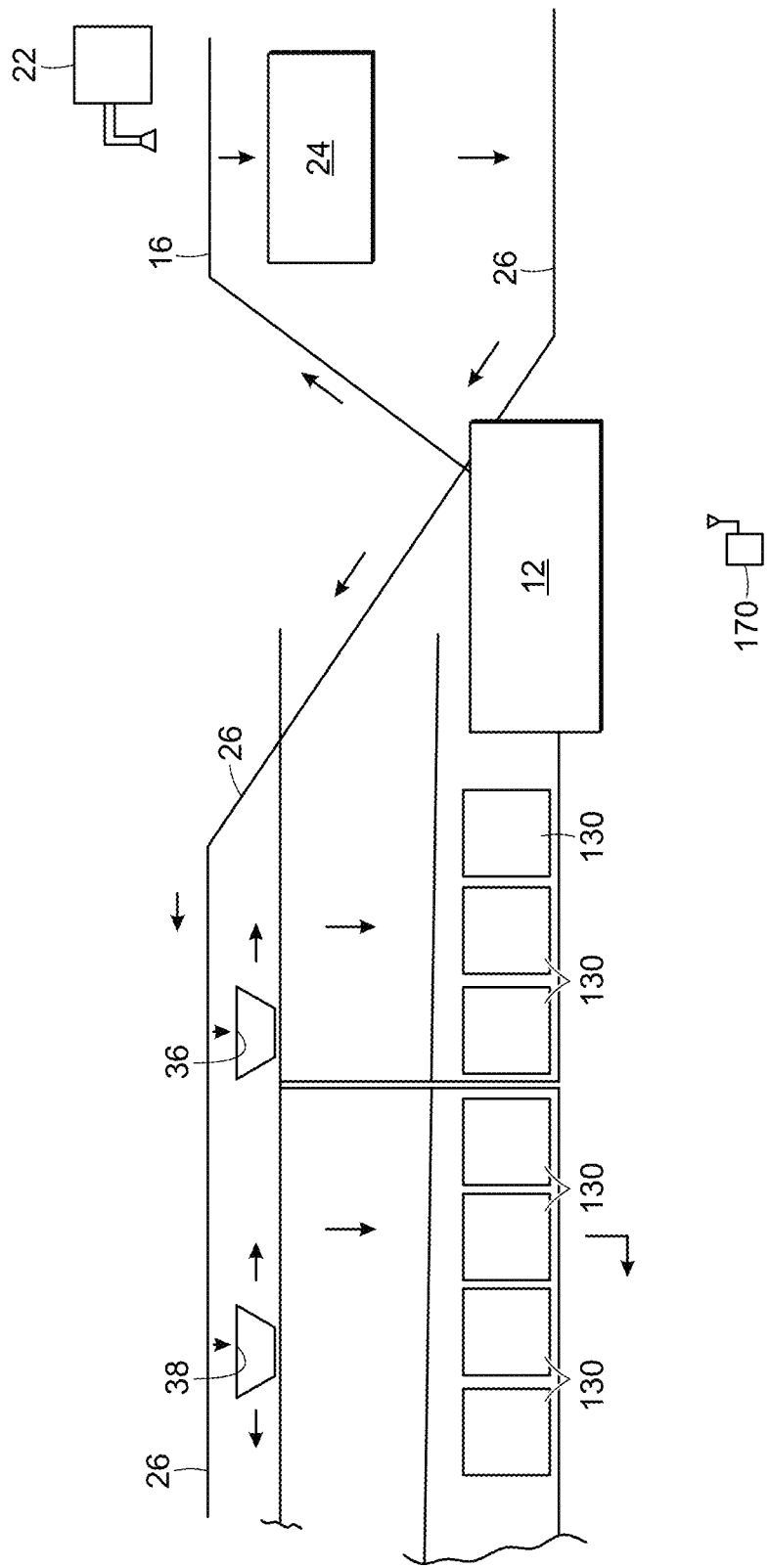
FIG. 2 shows an illustrative diagrammatic processing side view of the system of FIG. 1.

The flow of objects is diagrammatically shown in FIG. 2, which shows that objects move from the infeed area 12 to the intermediate conveyor 16. The programmable motion device 22 drops the objects into the drop perception unit 24, and the objects then land on the primary transport system 26. The objects are then conveyed by the primary transport system 26 to diverters that selectively divert objects to carriages (e.g., 36, 38). The carriages bring the objects to one of a plurality of destination stations 130 (e.g., a processing box or a processing bin) and drops the object into the appropriate destination station. When a destination station is full or otherwise complete, the destination station is moved to an output conveyor.

Figure 3:
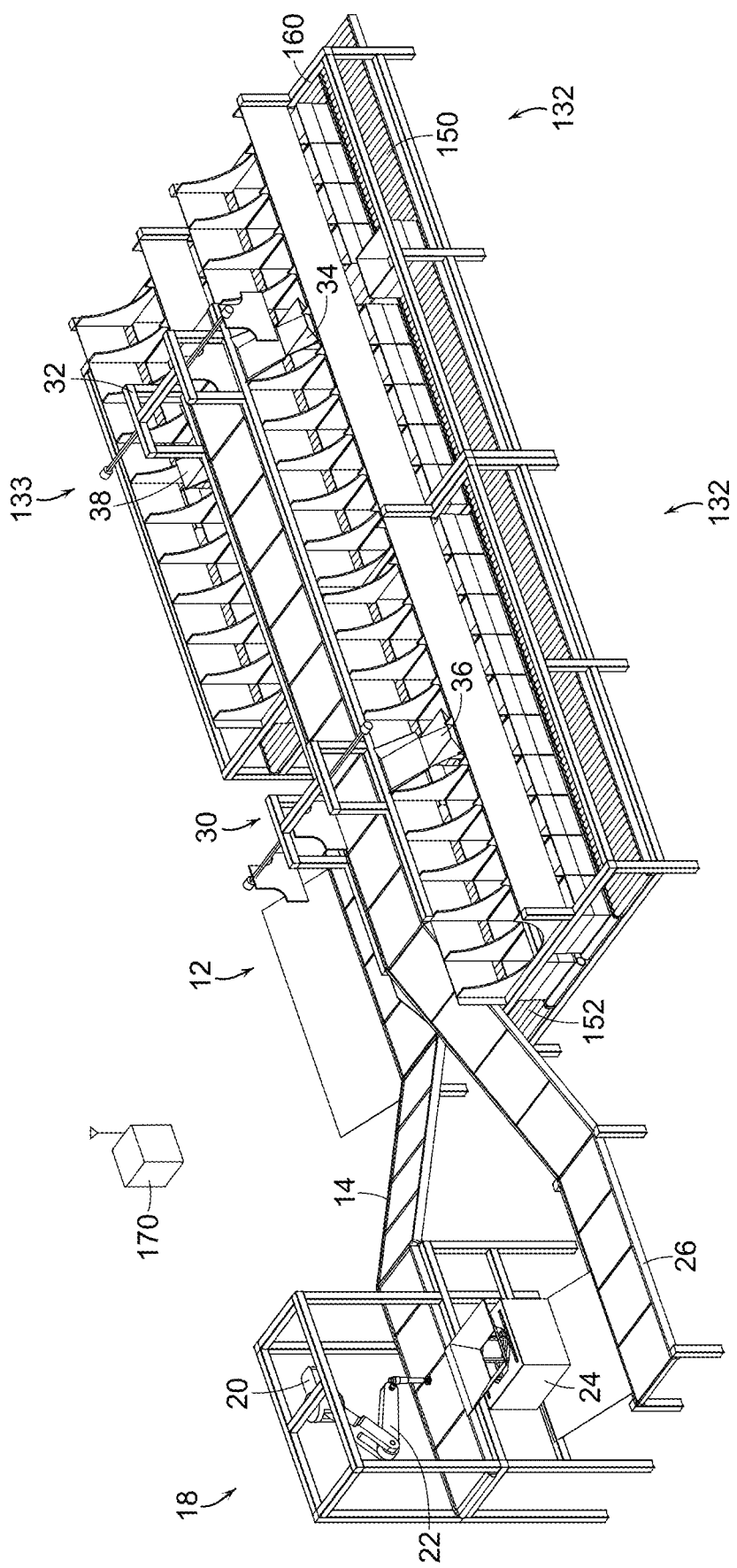
FIG. 3 shows another illustrative diagrammatic rear view of the system of FIG. 1.

FIG. 3 shows a rear view of the system of FIG. 1 that more clearly shows the programmable motion device 22 and the drop perception system 24. The primary transport system 26 may be a cleated conveyor and the objects may be dropped onto the cleated conveyor such that one object is provided per cleated section. The speeds of the conveyors 14 and 26 may also be controlled to assist in providing a singulated stream of objects to the diverters 30, 32. With reference again to FIG. 1, the destination stations 130 (again, e.g., bins or boxes), are provided on destination input conveyors 160, 162, which may be gravity fed such that bins or boxes thereon are biased to move toward the processing station 18 (as generally shown by corresponding arrows). The destination output conveyors 150, 152, 154 may also be gravity fed to permit finished bins or boxes to be provided away from the processing station 18 (again, as generally shown by corresponding arrows). In further embodiments, the conveyors 150, 152, 154, 160, 162 may be gravity biased in any direction, or may be actively power controlled. The system may operate using a computer processing control system 170 that communicates with the conveyor control systems, the perception units, the programmable motion device, the diverters, the box or bin removal systems (as discussed below), and any and all sensors that may be provided in the system.

Figure 4:
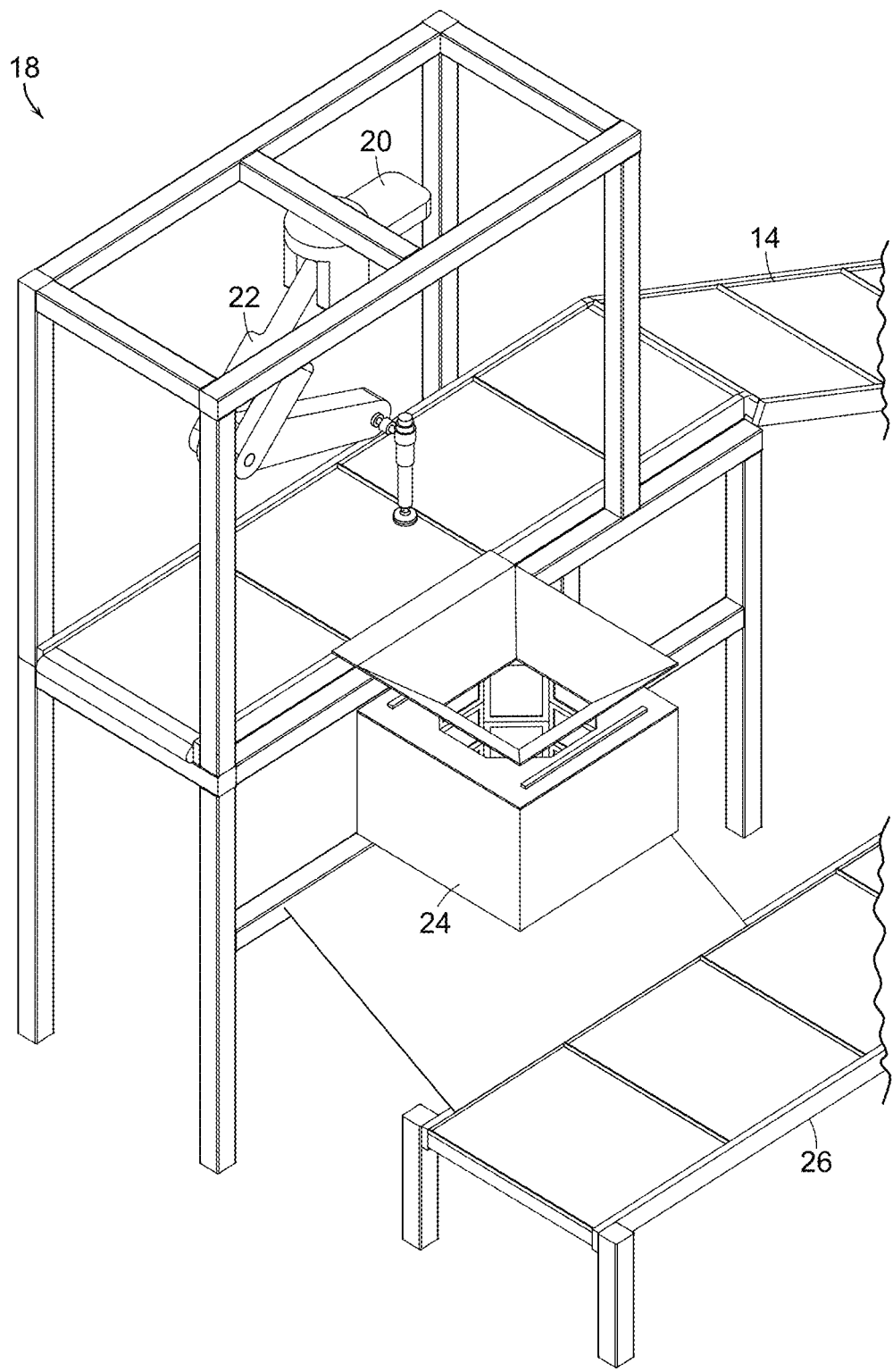
FIG. 4 shows an illustrative diagrammatic view of a programmable motion device processing station in the system of FIG. 1.
Figure 5:
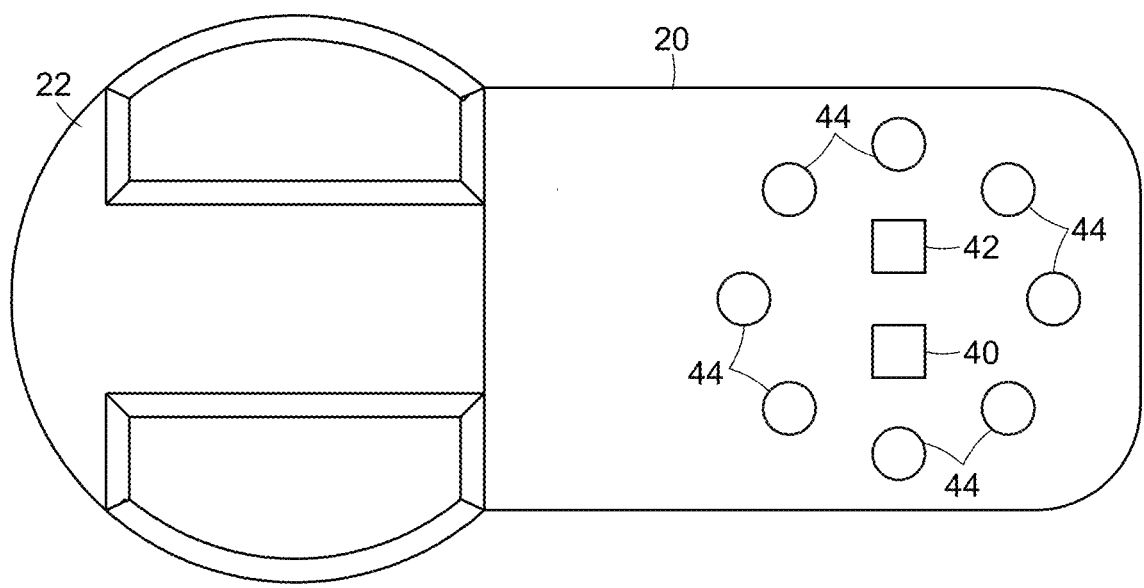
FIG. 5 shows an illustrative diagrammatic view of the perception system of FIGS. 2-4.

With reference to FIG. 4, the processing station 18 of an embodiment includes a grasp perception system 20 that is mounted above the intermediate conveyor 16, which provides objects to be processed. The grasp perception system 20, for example and with reference to FIG. 5, may include (on the underside thereof), a camera 40, a depth sensor 42 and lights 44. A combination of 2D and 3D (depth) data is acquired. The depth sensor 42 may provide depth information that may be used together with the camera image data to determine depth information regarding the various objects in view. The lights 44 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

The programmable motion device 22 may include a robotic arm equipped with sensors and computing, that when combined is assumed herein to exhibit the following capabilities: (a) it is able to pick objects up from a singulated stream of objects using, for example, an end effector; (b) it is able to move the object to arbitrary places within its workspace; and, (c) it is able to generate a map of objects that it is able to pick, represented as a candidate set of grasp points in the workcell, and as a list of polytopes enclosing the object in space. The allowable objects are determined by the capabilities of the robotic system. Their size, weight and geometry are assumed to be such that the robotic system is able to pick, move and place them. These may be any kind of ordered goods, packages, parcels, or other articles that benefit from automated processing.

Figure 6:
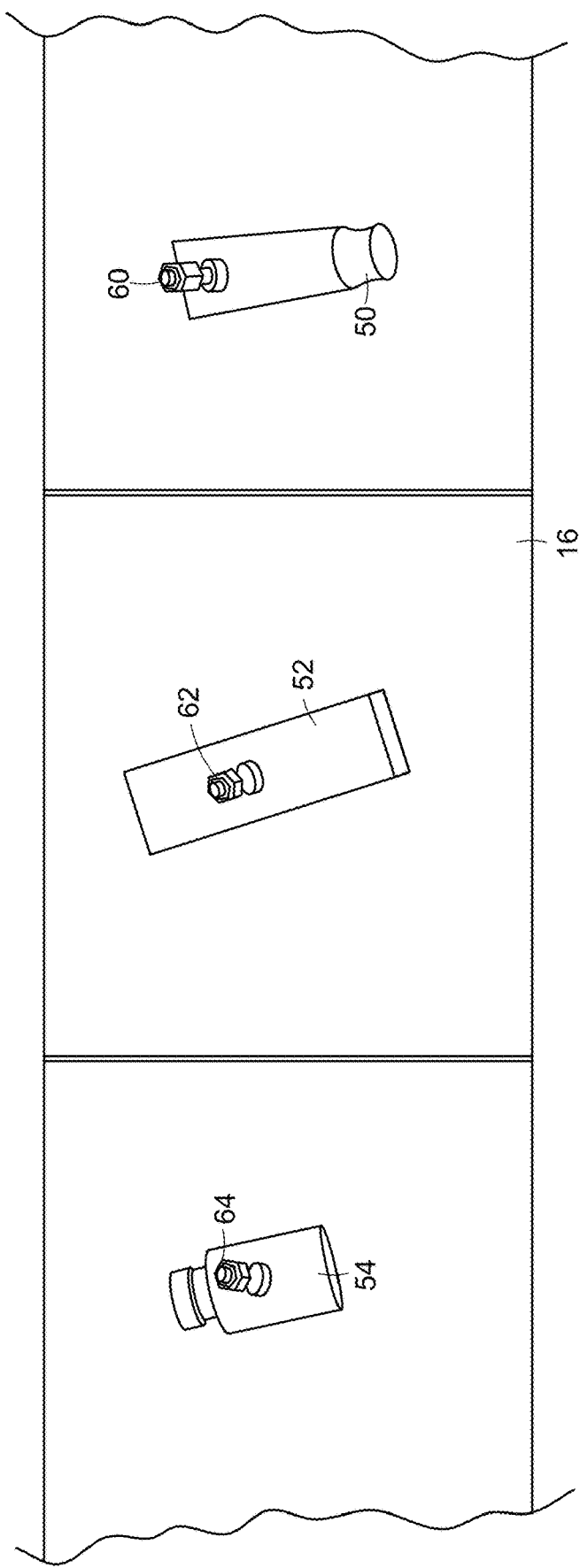
FIG. 6 shows an illustrative diagrammatic view from the perception system of FIGS. 2-4, showing a view of objects to be processed.

FIG. 6 shows a representation of an image detected by the grasp perception system 20 as it views objects 50, 52, 54 on the intermediate conveyor 16. Superimposed on the objects 50, 52, 54 (for illustrative purposes) are anticipated grasp locations 60, 62, 64 of the objects. Note that while candidate grasp locations 60, 62, 64 appear to be good grasp locations, other grasp locations may not be good grasp locations if the location is too near an edge of an object, or if the grasp location is on a very irregular surface of the object or if the object is partially obscured by another object. Candidate grasp locations may be indicated using a 3D model of the robot end effector placed in the location where the actual end effector would go to use as a grasp location as shown in FIG. 6. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur (e.g., on the right), or will acquire the object at a grasp location that is very far from the center of mass of the object (e.g., on the left) and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 7A:
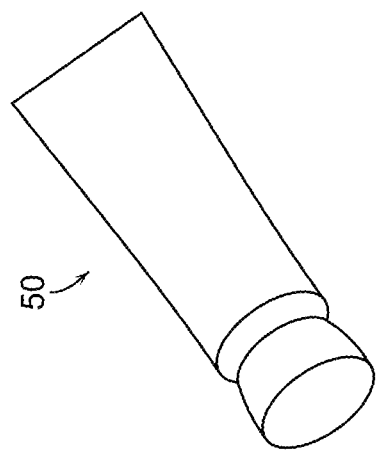
FIGS. 7A and 7B show illustrative diagrammatic views of a grasp selection process in an object processing system of an embodiment of the present invention.
Figure 7B:
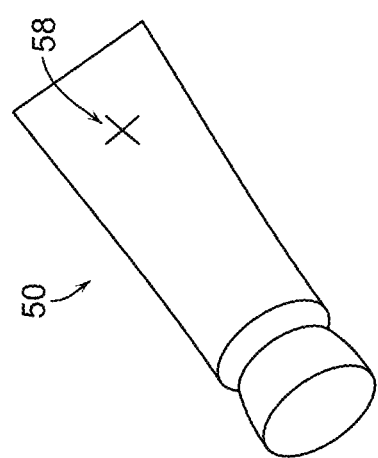

As shown in FIGS. 7A and 7B, the perception system may also identify portions of an object that are the most flat in the generation of good grasp location information. In particular, if an object includes a tubular end and a flat end such as object 50, the system would identify the more flat end as shown at 58 in FIG. 7B. Additionally, the system may select the area of an object where a UPC code appears, as such codes are often printed on a relatively flat portion of the object to facilitate scanning of the barcode.

Figure 9A:
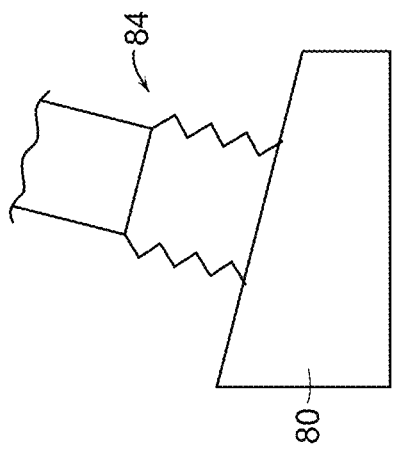
FIGS. 9A and 9B show illustrative diagrammatic views of a grasp execution process in an object processing system of an embodiment of the present invention.
Figure 9B:
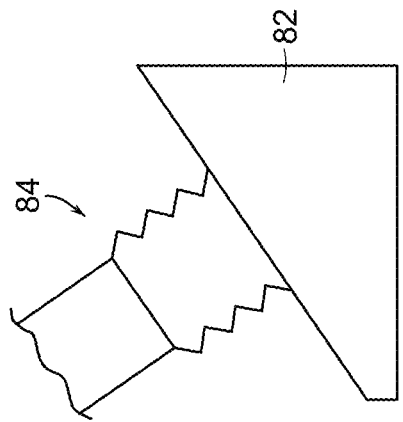
Figure 8A:
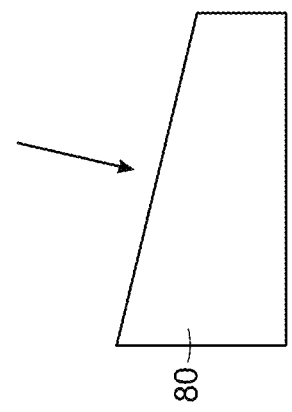
FIGS. 8A and 8B show illustrative diagrammatic views of a grasp planning process in an object processing system of an embodiment of the present invention.
Figure 8B:
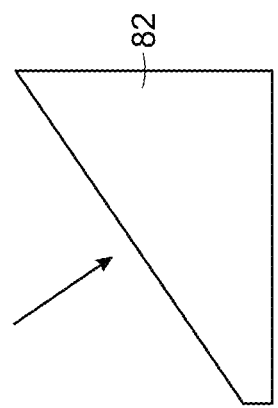

FIGS. 8A and 8B show that for each object 80, 82, the grasp selection system may determine a direction that is normal to the selected flat portion of the object 80, 82. As shown in FIGS. 9A and 9B, the robotic system will then direct the end effector 84 to approach each object 80, 82 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical or "gantry" picks), and that such grasp points may be chosen using fiducial features as grasp points, such as picking on a barcode, given that barcodes are almost always applied to a flat spot on the object. The invention also provides operator assist, where an object that the system has repeatedly failed to grasp has a correct grasp point identified by a human, as well as operator assist, where the operator identifies bad grasp plans, thus removing them and saving the time of the system attempting to execute them.

In accordance with various embodiments therefore, the invention further provides a sortation system that may learn object grasp locations from experience and human guidance. Systems designed to work in the same environments as human workers will face an enormous variety of objects, poses, etc. This enormous variety almost ensures that the robotic system will encounter some configuration of object(s) that it cannot handle optimally; at such times, it is desirable to enable a human operator to assist the system and have the system learn from non-optimal grasps.

The system optimizes grasp points based on a wide range of features, either extracted offline or online, tailored to the gripper's characteristics. The properties of the suction cup influence its adaptability to the underlying surface, hence an optimal grasp is more likely to be achieved when picking on the estimated surface normal of an object rather than performing vertical gantry picks common to current industrial applications.

In addition to geometric information the system uses appearance-based features since depth sensors may not always be accurate enough to provide sufficient information about graspability. For example, the system can learn the location of fiducials such as barcodes on the object, which can be used as indicator for a surface patch that is flat and impermeable, hence suitable for a suction cup. One such example is shipping boxes and bags, which tend to have the shipping label at the object's center of mass and provide an impermeable surface, as opposed to the raw bag material which might be slightly porous and hence not present a good grasp.

By identifying bad or good grasp points on the image, a correlation is established between features in the 2D/3D imagery and the idea of good or bad grasp points; using this data and these correlations as input to machine learning algorithms, the system can eventually learn, for each image presented to it, where to grasp and where to avoid.

This information is added to experience based data the system collects with every pick attempt, successful or not. Over time the robot learns to avoid features that result in unsuccessful grasps, either specific to an object type or to a surface/material type. For example, the robot may prefer to avoid picks on shrink wrap, no matter which object it is applied to, but may only prefer to place the grasp near fiducials on certain object types such as shipping bags.

This learning can be accelerated by off-line generation of human-corrected images. For instance, a human could be presented with thousands of images from previous system operation and manually annotate good and bad grasp points on each one. This would generate a large amount of data that could also be input into the machine learning algorithms to enhance the speed and efficacy of the system learning.

In addition to experience based or human expert based training data, a large set of labeled training data can be generated based on a detailed object model in physics simulation making use of known gripper and object characteristics. This allows fast and dense generation of graspability data over a large set of objects, as this process is not limited by the speed of the physical robotic system or human input.

The correct processing destination is determined from the symbol (e.g., barcode) on the object. It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers, which identify the object.

Once grasped, the object may be moved by the programmable motion device 22 to a primary perception system 24 (such as a drop scanner). The object may even be dropped into the perception system 24. In further embodiments, if a sufficiently singulated stream of objects is provided on the intermediate conveyor 16, the programmable motion device may be provided as a diverter (e.g., a push or pull bar) that diverts object off of the intermediate conveyor into the drop scanner. Additionally, the movement speed and direction of the intermediate conveyor 16 (as well as the movement and speed of infeed conveyor 14) may be controlled to further facilitate providing a singulated stream of objects on the intermediate conveyor 16 adjacent the drop scanner.

Figure 10:
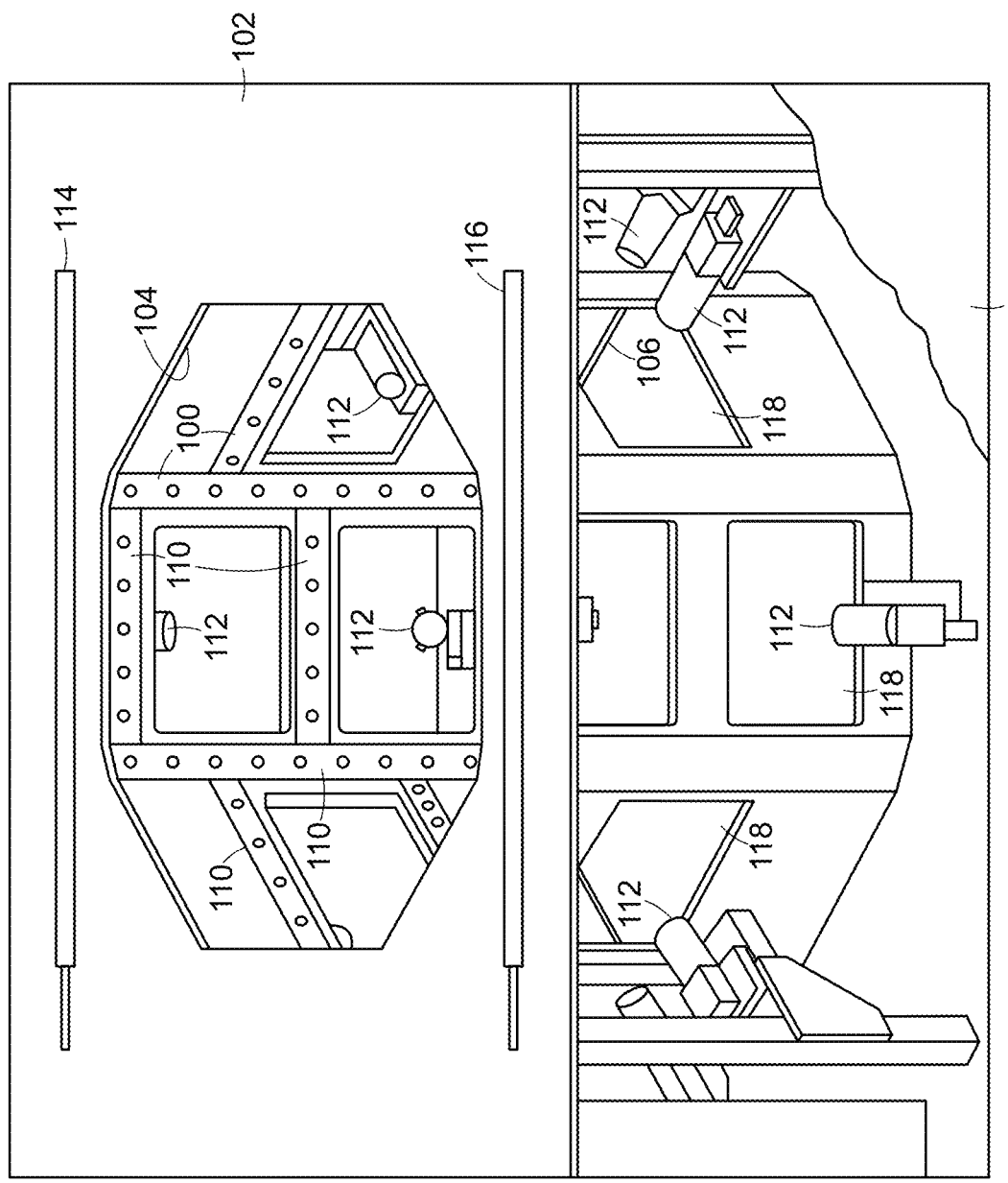
FIG. 10 shows an illustrative diagrammatic front view of a drop perception system of FIG. 1.
Figure 11:
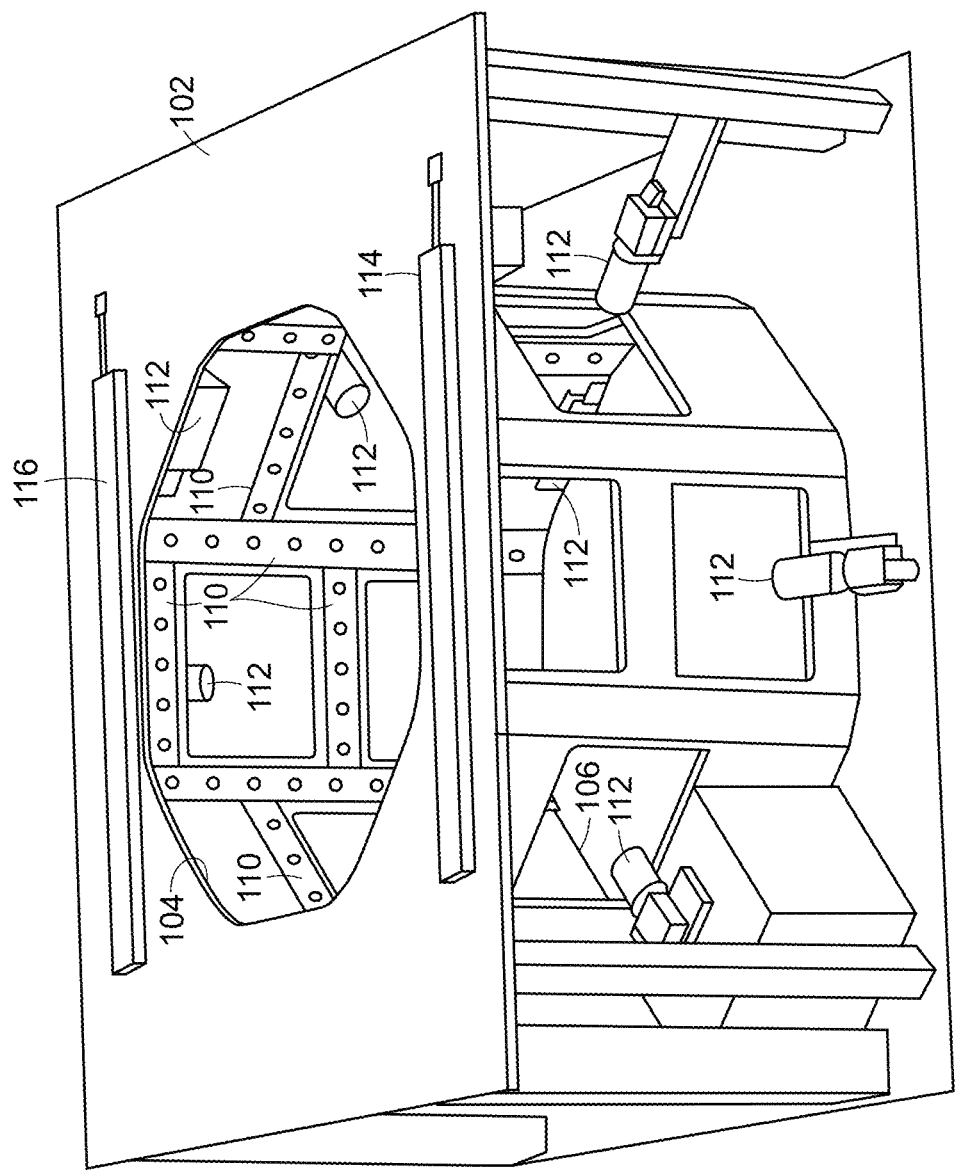
FIG. 11 shows an illustrative diagrammatic rear view of a drop perception system of FIG. 1.

As further shown in FIGS. 10 and 11, the primary perception system 24 may include a structure 102 having a top opening 104 and a bottom opening 106, and may be covered by an enclosing material 108. The structure 102 includes a plurality of sources (e.g., illumination sources such as LEDs) 110 as well as a plurality of image perception units (e.g., cameras) 112. The sources 60 may be provided in a variety of arrangements, and each may be directed toward the center of the opening. The perception units 112 are also generally directed toward the opening, although some cameras are directed horizontally, while others are directed upward, and some are directed downward. The system 24 also includes an entry source (e.g., infrared source) 114 as well as an entry detector (e.g., infrared detector) 116 for detecting when an object has entered the perception system 24. The LEDs and cameras therefore encircle the inside of the structure 102, and the cameras are positioned to view the interior via windows that may include a glass or plastic covering (e.g., 118).

An aspect of certain embodiments of the present invention, is the ability to identify via barcode or other visual markings of objects by employing a perception system into which objects may be dropped. Automated scanning systems would be unable to see barcodes on objects that are presented in a way that their barcodes are not exposed or visible. The system 24 therefore is designed to view an object from a large number of different views very quickly, reducing or eliminating the possibility of the system 24 not being able to view identifying indicia on an object.

Key features in the perception system are the specific design of the perception system so as to maximize the probability of a successful scan, while simultaneously minimizing the average scan time. The probability of a successful scan and the average scan time make up key performance characteristics. These key performance characteristics are determined by the configuration and properties of the perception system, as well as the object set and how they are marked.

The two key performance characteristics may be optimized for a given item set and method of labeling. Parameters of the optimization for a system include how many scanners, where and in what orientation to place them, and what sensor resolutions and fields of view for the scanners to use. Optimization can be done through trial and error, or by simulation with models of the object.

Optimization through simulation employs a scanner performance model. A scanner performance model is the range of positions, orientations and barcode element size that an identifying symbol can be detected and decoded by the scanner, where the barcode element size is the size of the smallest feature on the symbol. These are typically rated at a minimum and maximum range, a maximum skew angle, a maximum pitch angle, and a minimum and maximum tilt angle.

Typical performance for camera-based scanners are that they are able to detect symbols within some range of distances as long as both pitch and skew of the plane of the symbol are within the range of plus or minus 45 degrees, while the tilt of the symbol can be arbitrary (between 0 and 360 degrees). The scanner performance model predicts whether a given symbol in a given position and orientation will be detected.

The scanner performance model is coupled with a model of where symbols would expect to be positioned and oriented. A symbol pose model is the range of all positions and orientations, in other words poses, in which a symbol will expect to be found. For the scanner, the symbol pose model is itself a combination of an article gripping model, which predicts how objects will be held by the robotic system, as well as a symbol-item appearance model, which describes the possible placements of the symbol on the object. For the scanner, the symbol pose model is itself a combination of the symbol-item appearance model, as well as an inbound-object pose model, which models the distribution of poses over which inbound articles are presented to the scanner. These models may be constructed empirically, modeled using an analytical model, or approximate models may be employed using simple sphere models for objects and uniform distributions over the sphere as a symbol-item appearance model.

Following detection by the perception unit 24, the object is now positively identified and drops onto the primary transport system 26 (e.g., a conveyor). With reference again to FIGS. 1 and 3, the primary transport system 26 moves the identified object toward diverters 30, 32 that are selectively engageable to divert the object off of the conveyor into any of carriages 34, 36, 38 or (if the object was not able to be identified), the object may be either returned to the input area 12 or it may be dropped off of the end of the conveyor 26 into a manual processing bin. Each carriage 34, 36, 38 is reciprocally movable among destination bins 130 of one of a plurality of destination sections 132. Efficiencies in space may be provided in accordance with certain embodiments by having objects first move from the input area 12 along the infeed conveyor 14 in a direction that includes a horizontal component and a vertical component. The object then drops through the drop scanner 24 (vertically) and lands on the primary transport conveyor 26, which also moves the object in a direction that has a horizontal component (opposite in direction to that of the infeed conveyor 14) and a vertical component. The object is then moved horizontally by a carriage 36, 38, and dropped (vertically) above a target destination station 130, such as a destination bin.

Figure 12A:
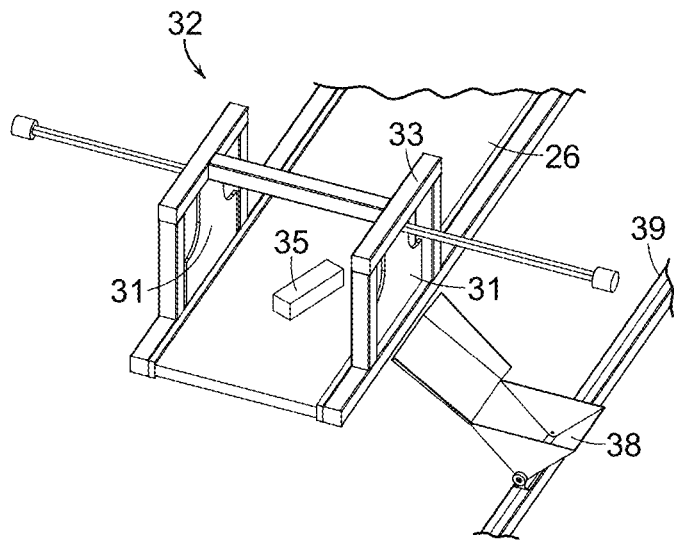
FIGS. 12A-12C show illustrative diagrammatic views of an object diverting system of FIG. 1.
Figure 12B:
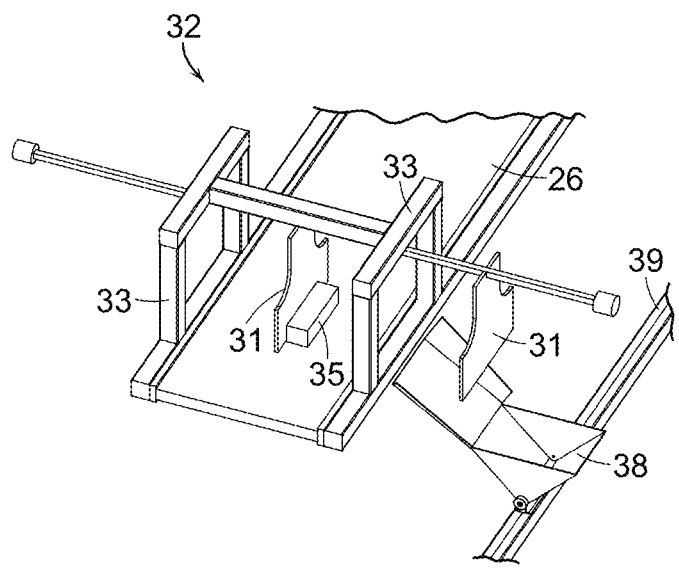
Figure 12C:
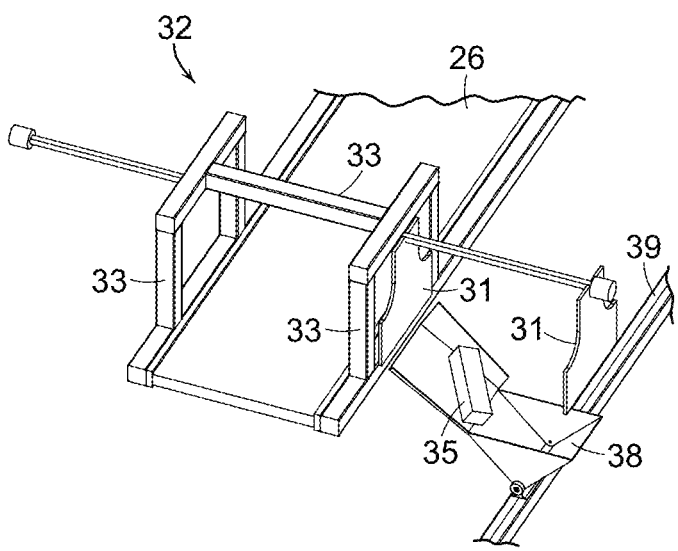

With reference to FIGS. 12A-12B, a diverter unit (e.g., 32) may be actuated to urge an object (e.g., 35) off of the conveyor 26 into a selected carriage (e.g., 38) that runs along a rail 39 between destination locations. The diverter unit may include a pair of paddles 31 that are suspended by a frame 33 that permits the paddles to be actuated linearly to move an object off of the conveyor in either direction transverse to the conveyor. Again, with reference to FIG. 1, one direction of diversion for diverter 30, is to return an object to the infeed area 12.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

Figure 13:
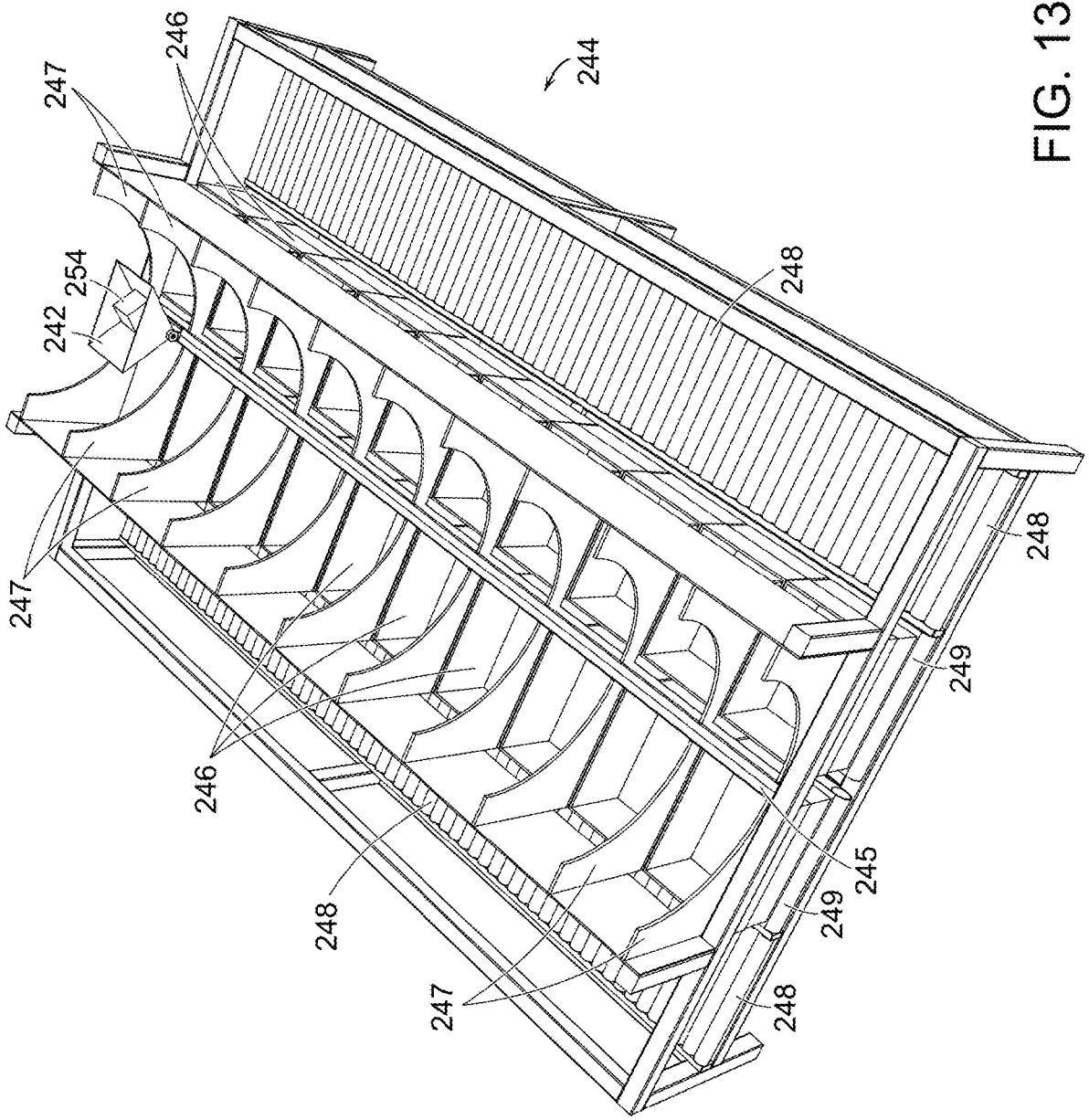
FIG. 13 shows an illustrative diagrammatic view of a processing section in an object processing system in accordance with an embodiment of the invention wherein an object is placed in a carriage.
Figure 14:
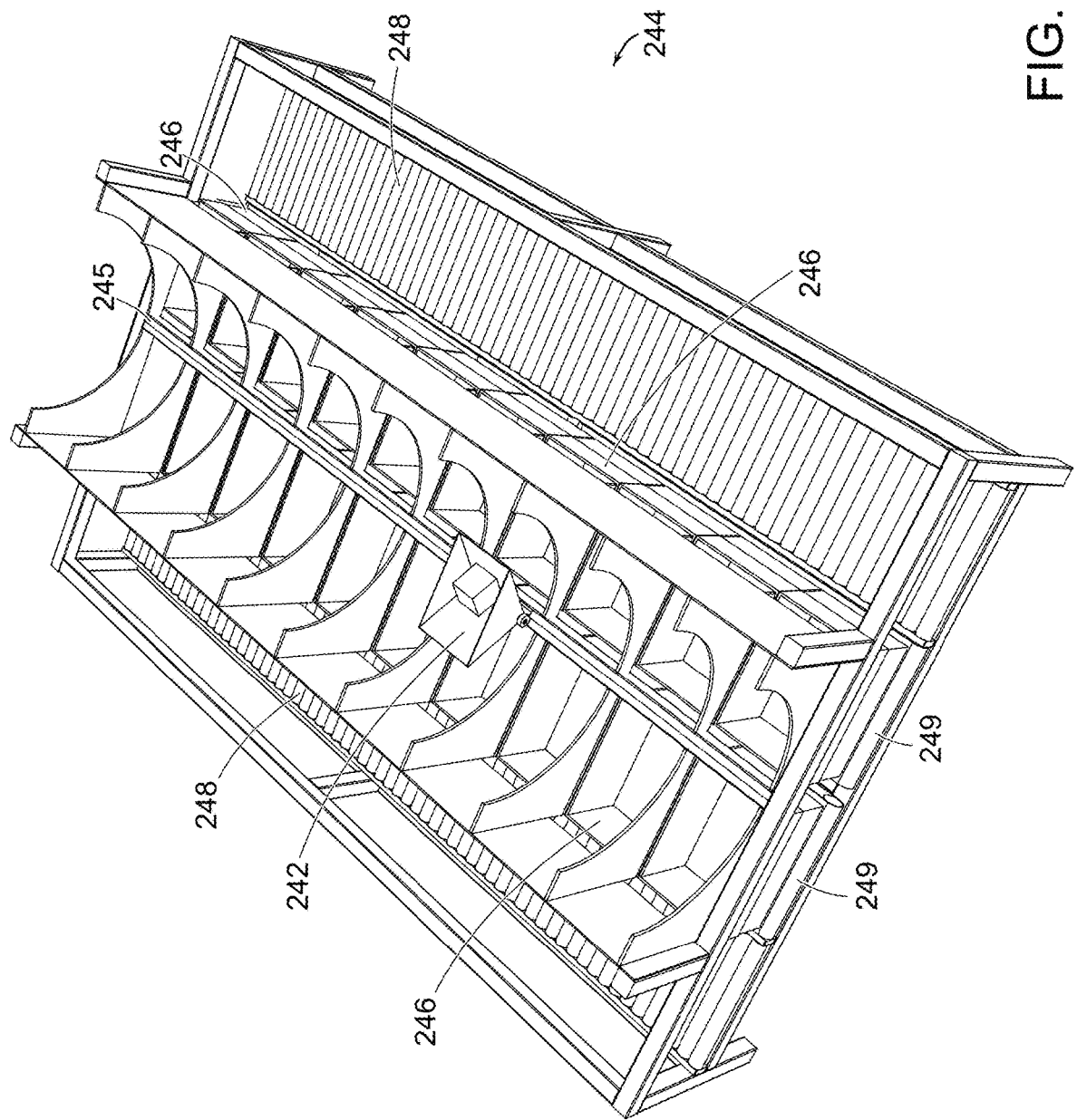
FIG. 14 shows an illustrative diagrammatic view of the processing section of FIG. 13 with the carriage having been moved along its track.
Figure 15:
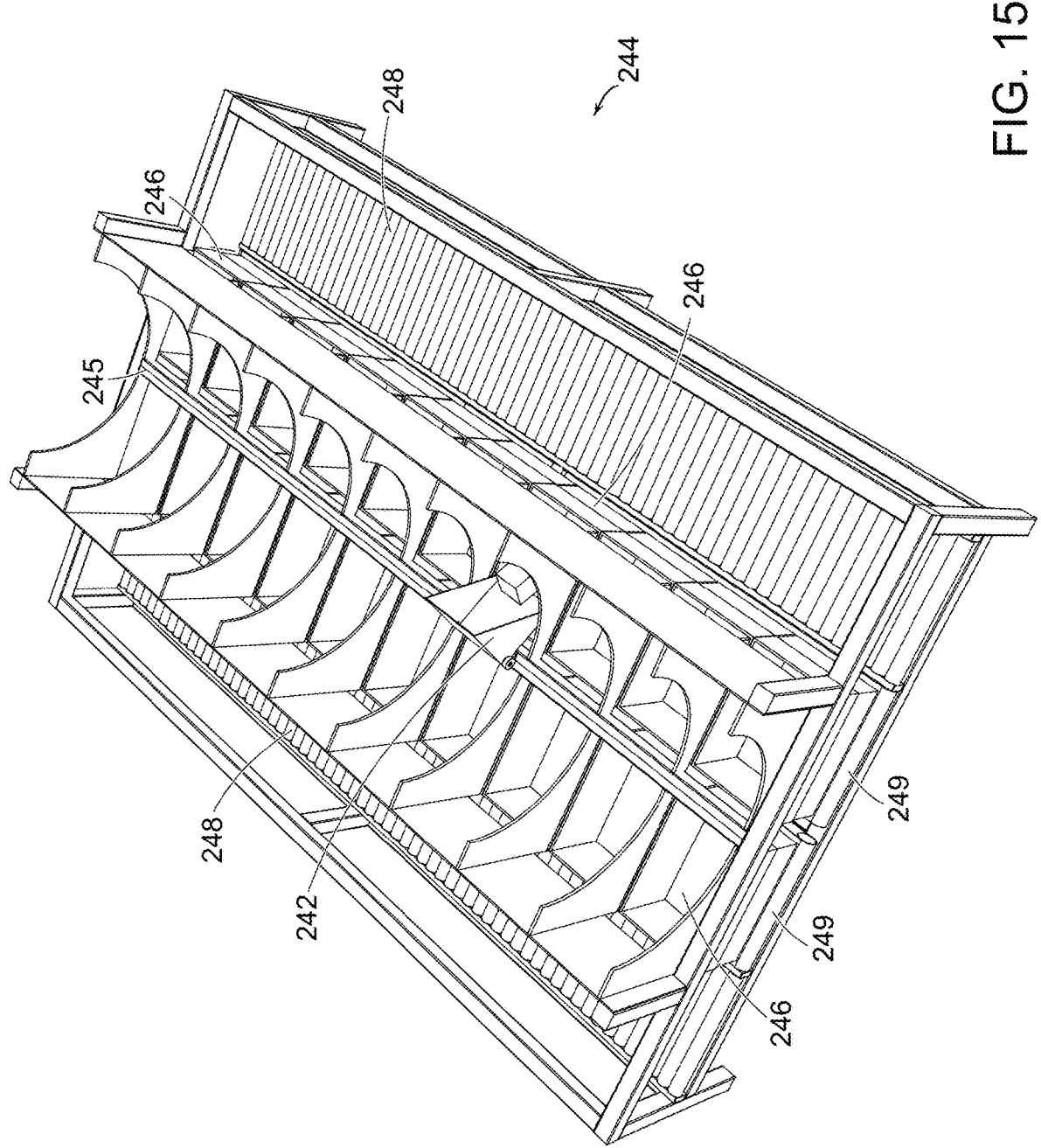
FIG. 15 shows an illustrative diagrammatic view of the processing section of FIG. 13 with the carriage having transferred its load to a destination bin.

FIG. 13 shows the destination section 244 (e.g., such as any of sections 132 of the system 30) that includes a movable carriage 242 that may receive an object 254 from the end effector of the programmable motion device. The movable carriage 242 is reciprocally movable between two rows of the destination bins 246 along a guide rail 245. As shown in FIG. 13, each destination bin 246 includes a guide chute 247 that guides an object dropped therein into the underlying destination bin 246. The carriage 242 moves along a track 245 (as further shown in FIG. 14), and the carriage may be actuated to drop an object 254 into a desired destination bin 246 via a guide chute 247 (as shown in FIG. 15).

The movable carriage 242 is therefore reciprocally movable between the destination bins, and the/each carriage moves along a track, and may be actuated to drop an object into a desired destination bin 224. The destination bins may be provided in a conveyor (e.g., rollers or belt), and may be biased (for example by gravity) to urge all destination bins toward one end (for example, the distal end). When a destination bin is selected for removal (e.g., because the bin is full or otherwise ready for further processing), the system will urge the completed bin onto an output conveyor to be brought to a further processing or shipment station. The conveyor may be biased (e.g., by gravity) or powered to cause any bin on the conveyor to be brought to an output location.

Figure 16A:
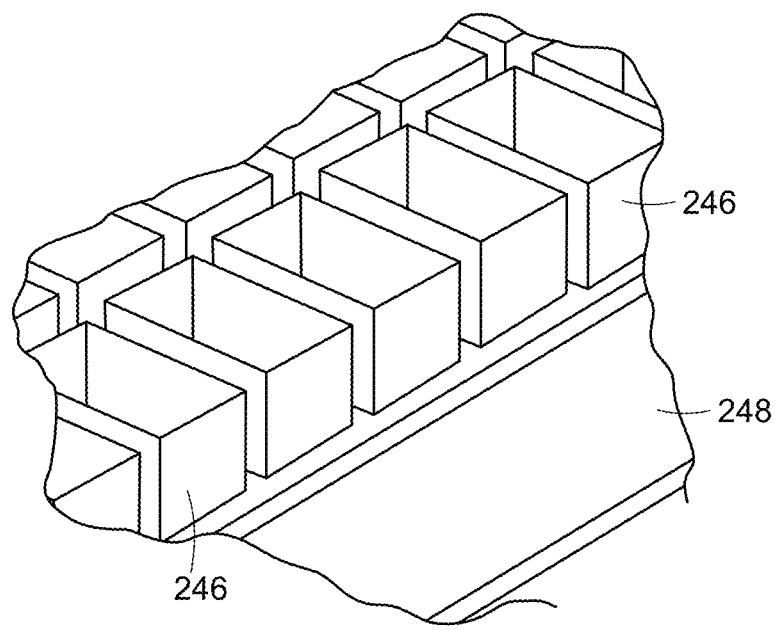
FIGS. 16A and 16B show illustrative diagrammatic views of a bin removal mechanism for use in an object processing system in accordance with an embodiment of the invention.
Figure 16B:
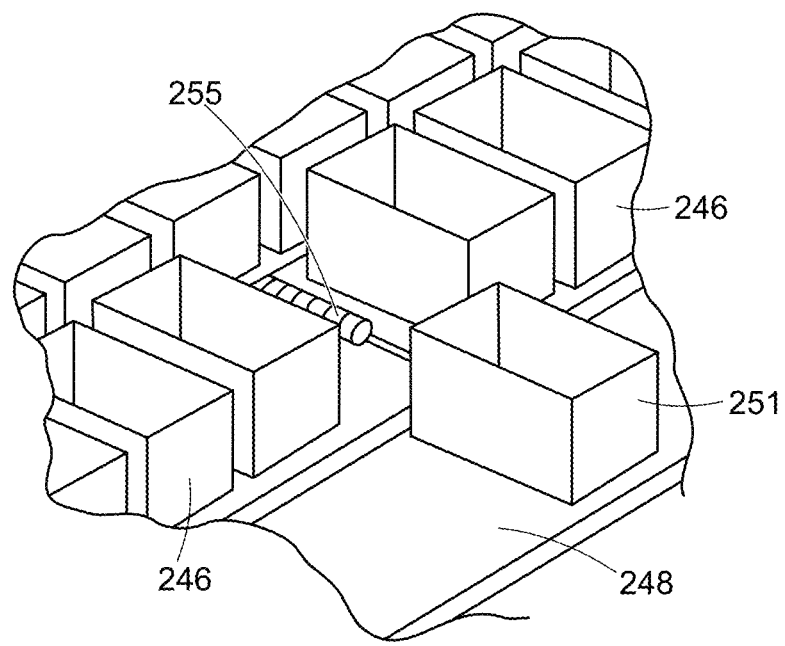

FIGS. 16A and 16B show a bin 251 being urged from the plurality of destination bins 246, onto the output conveyor 248 by the use of a displacement mechanism 255. In accordance with further embodiments, the destination bins may be provided as boxes or containers or any other type of device that may receive and hold an item, including box tray assemblies as discussed below.

Figure 17:
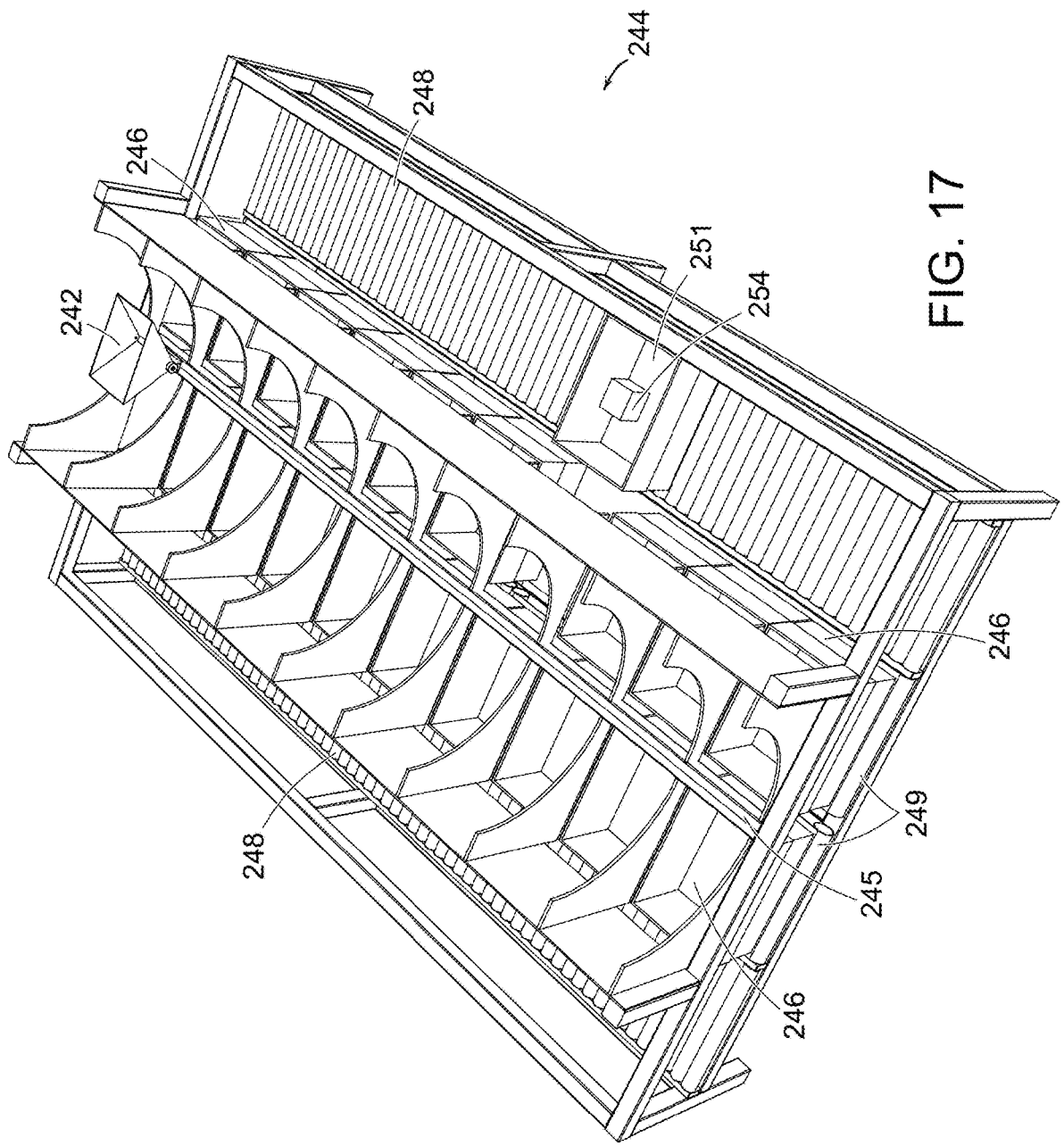
FIG. 17 shows an illustrative diagrammatic view of the processing section of FIG. 13 with the carriage having returned to its base, and a removed destination bin being urged from its location.
Figure 18:
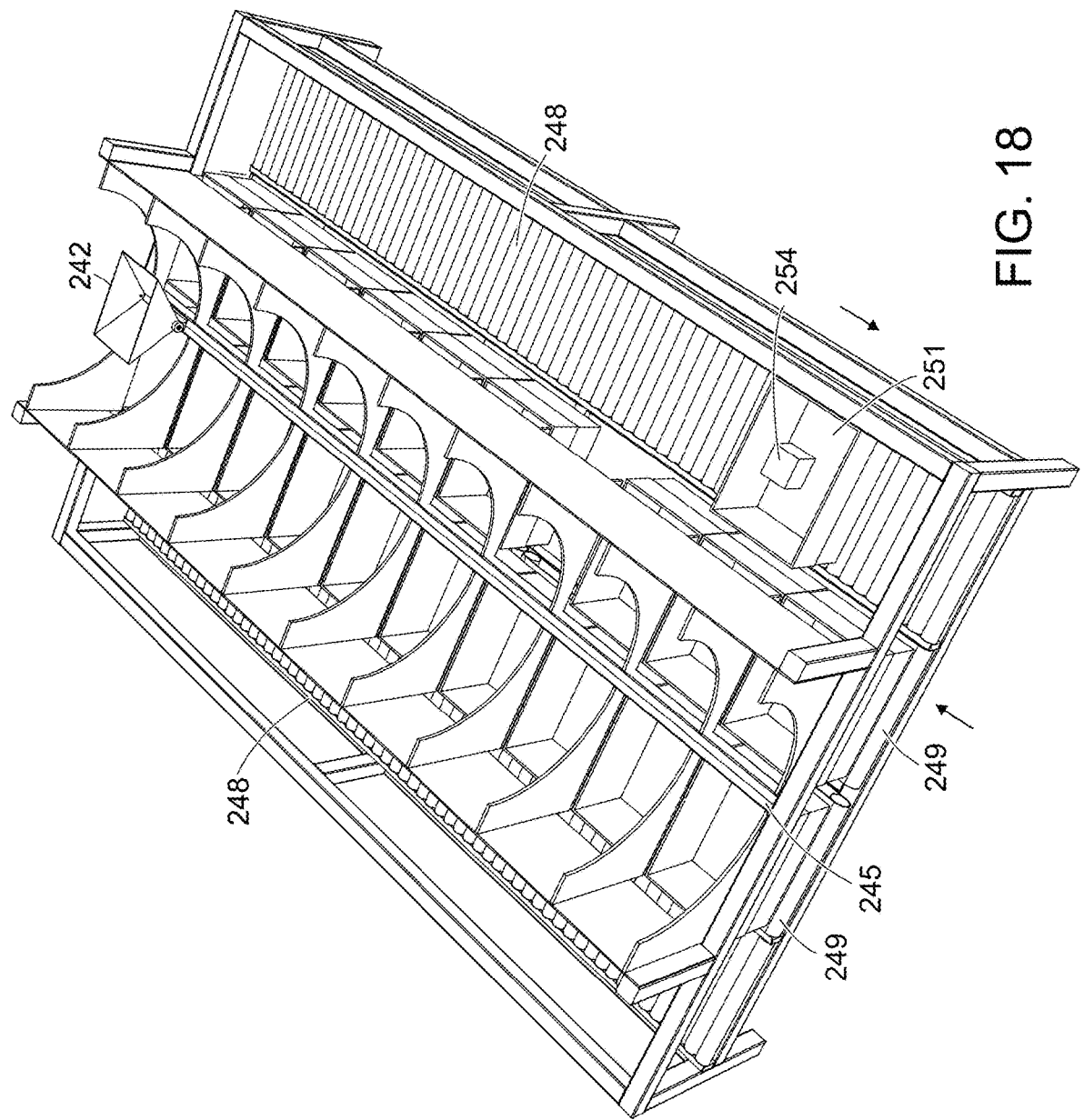
FIG. 18 shows an illustrative diagrammatic view of the processing section of FIG. 13 with the removed destination bin being moved along an output conveyor.

Following displacement of the bin 251 onto the conveyor 248 (as shown in FIG. 17), each of the remaining destination bins may be urged together (as shown in FIG. 18) and the system will record the change in position of any of the bins that moved. This way, a new empty bin may be added to the end, and the system will record the correct location and identified processing particulars of each of the destination bins.

As noted above, the bins 246 may be provided as boxes, totes, containers or any other type of device that may receive and hold an item. In further embodiments, the bins may be provided in uniform trays (to provide consistency of spacing and processing) and may further include open covers that may maintain the bin in an open position, and may further provide consistency in processing through any of spacing, alignment, or labeling.

Figure 19:
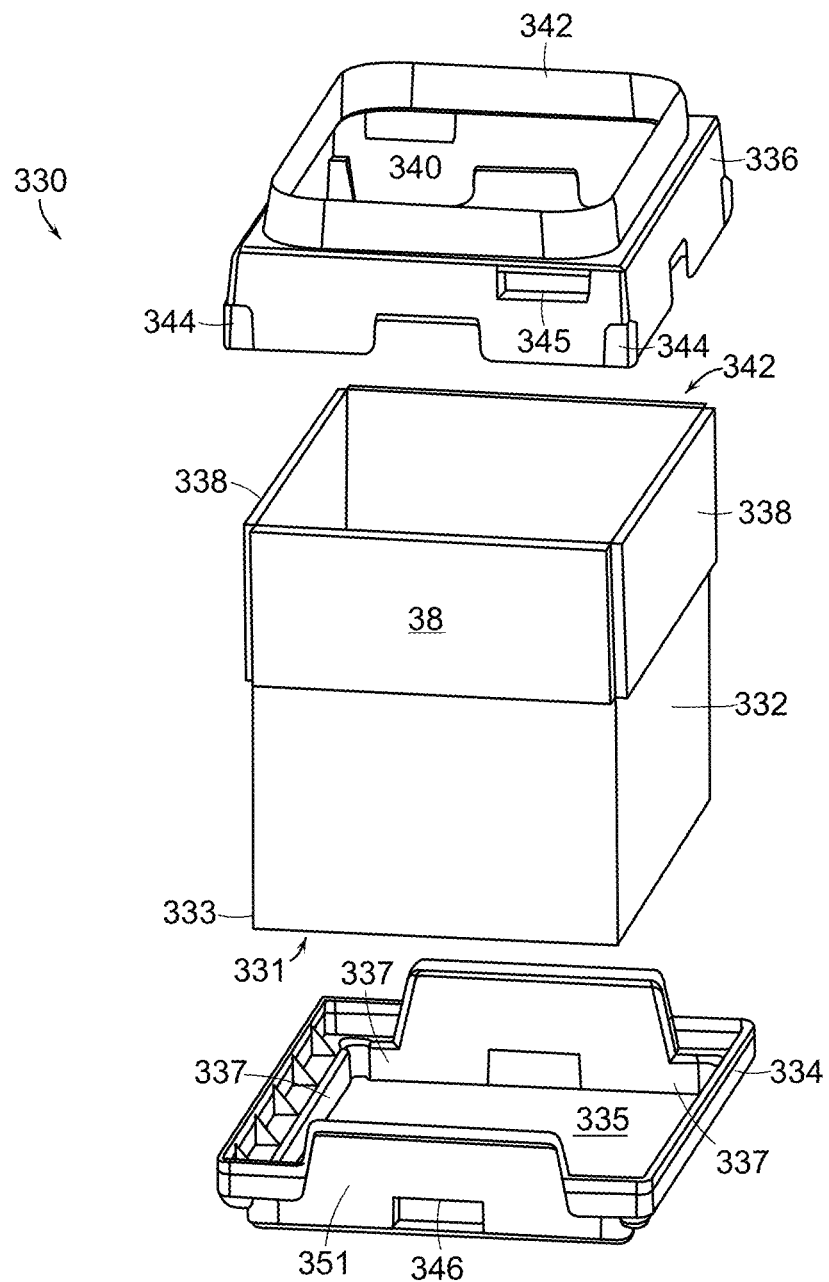
FIG. 19 shows an illustrative diagrammatic exploded view of a box assembly for use as a storage bin or destination bin in accordance with various embodiments of the present invention.

For example, FIG. 19 shows an exploded view of a box tray assembly 330. As shown, the box 332 (e.g., a standard shipping sized cardboard box) may include bottom 331 and side edges 333 that are received by a top surface 335 and inner sides 337 of a box tray 334. The box tray 334 may include a recessed (protected) area in which a label or other identifying indicia 346 may be provided, as well as a wide and smooth contact surface 351 that may be engaged by an urging or removal mechanism as discussed below.

As also shown in FIG. 19, the box 332 may include top flaps 338 that, when opened as shown, are held open by inner surfaces 340 of the box cover 336. The box cover 336 may also include a recessed (protected) area in which a label or other identifying indicia 345 may be provided. The box cover 336 also provides a defined rim opening 342, as well as corner elements 344 that may assist in providing structural integrity of the assembly, and may assist in stacking un-used covers on one another. Un-used box trays may also be stacked on each other.

Figure 20:
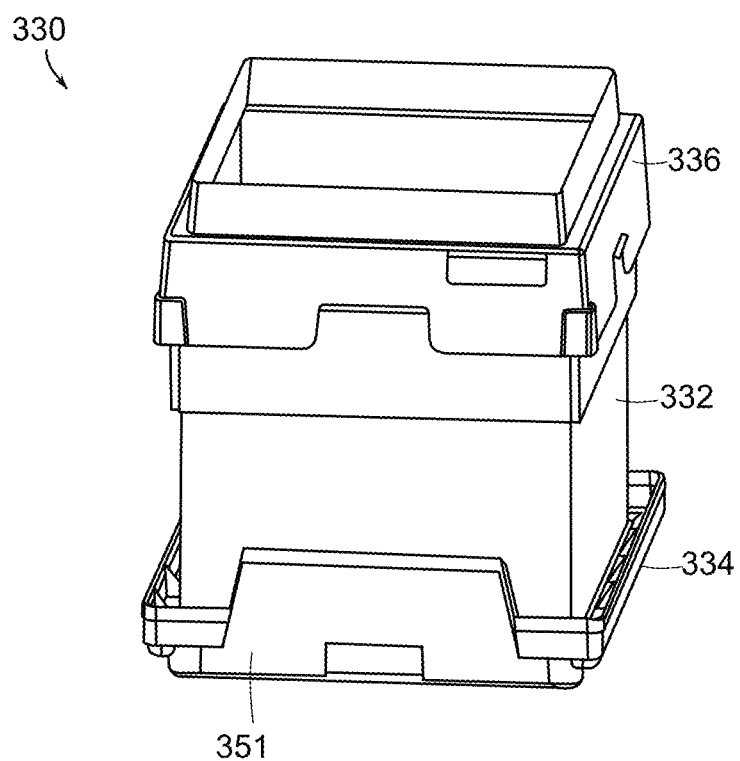
FIG. 20 shows an illustrative diagrammatic view of the assembled box tray assembly of FIG. 19.

The box 332 is thus maintained securely within the box tray 134, and the box cover 136 provides that the flaps 338 remain down along the outside of the box permitting the interior of the box to be accessible through the opening 342 in the box cover 336. FIG. 20 shows a width side view of the box tray assembly 330 with the box 332 securely seated within the box tray 334, and the box cover holding open the flaps 338 of the box 332. The box tray assemblies may be used as any or both of the storage bins and destination bins in various embodiments of the present invention. In various embodiments, the bins or boxes may further include a collection bag in the bin or box prior to receiving objects.

Figure 21A:
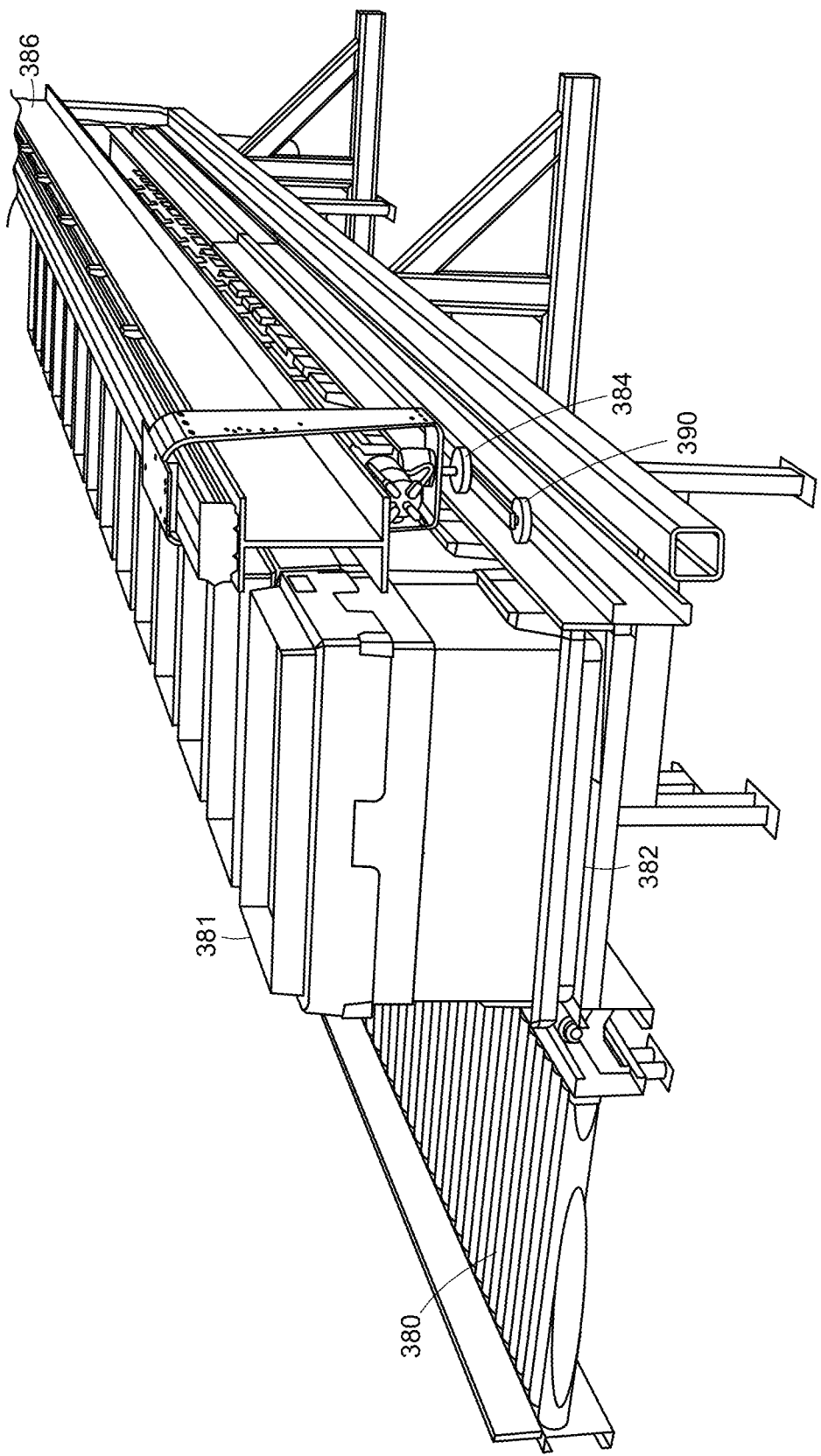
FIG. 21A-21D show illustrative diagrammatic views of a further embodiment of a bin displacement system for use in further embodiments of the invention.
Figure 21B:
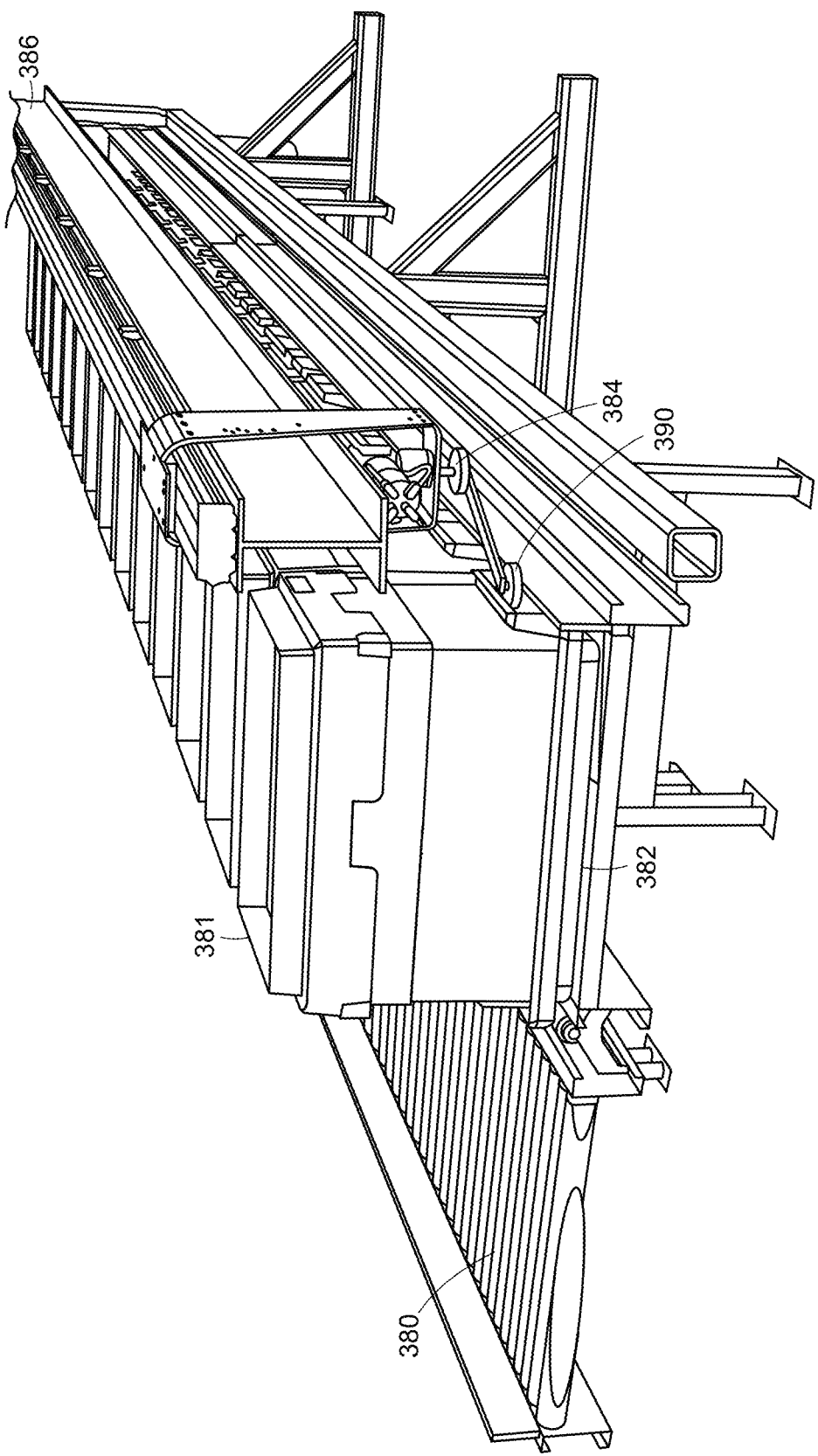
Figure 21C:
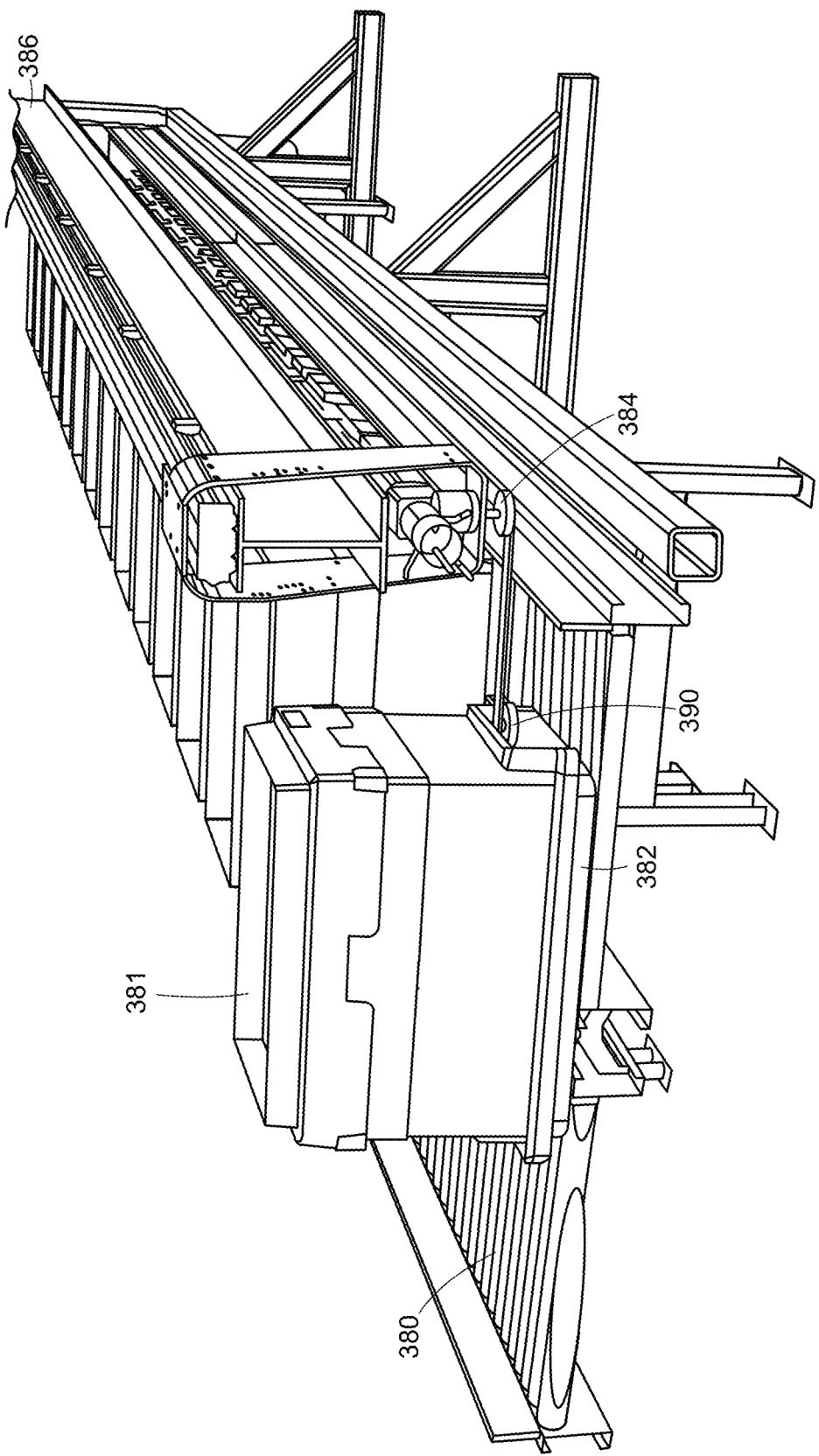
Figure 21D:
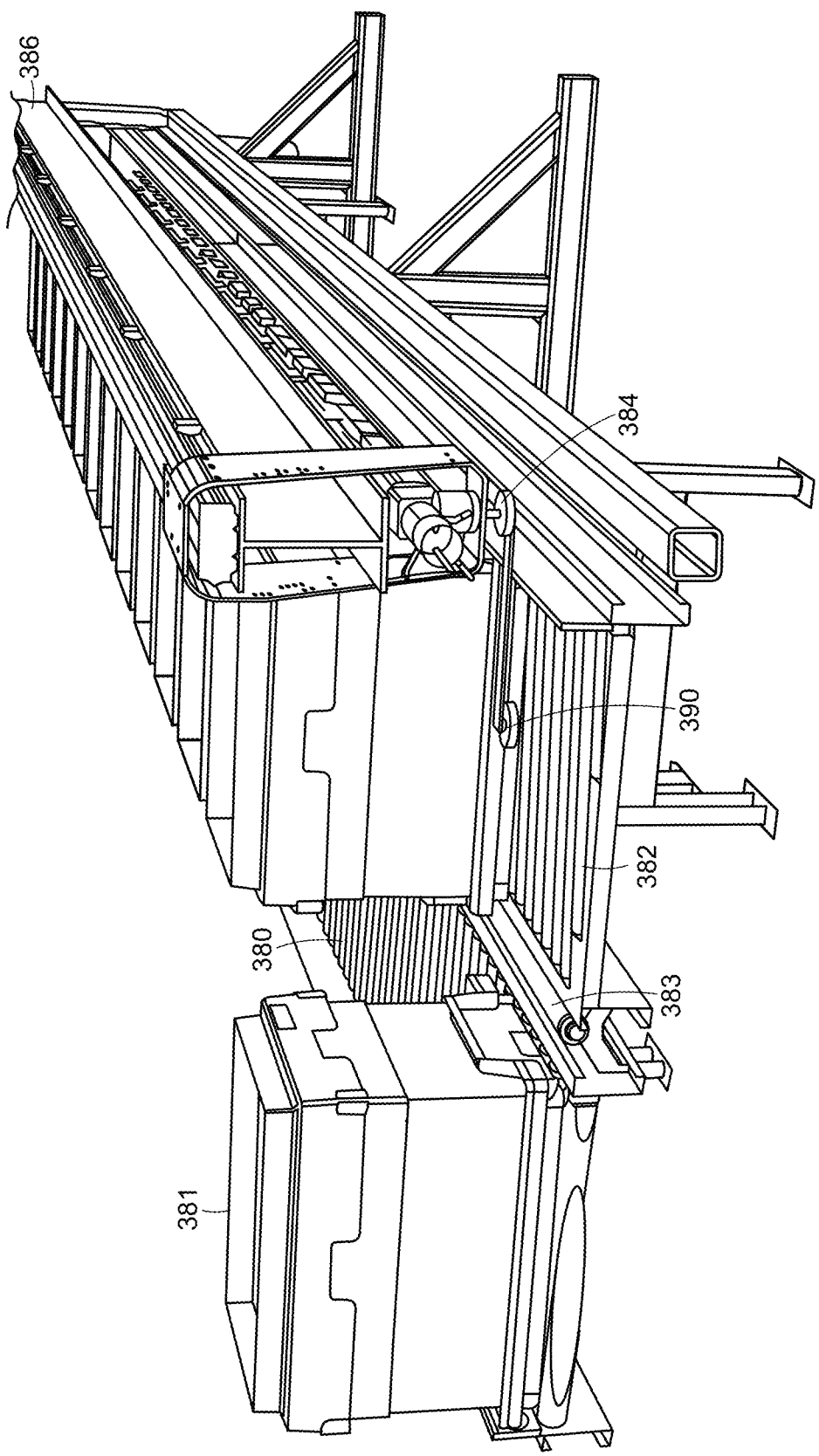

With reference to FIGS. 21A-21D, a box kicker 384 in accordance with an embodiment of the present invention may be suspended by and travel along a track 386, and may include a rotatable arm 388 and a roller wheel 390 at the end of the arm 388. With reference to FIGS. 21B-21D, when the roller wheel 390 contacts the kicker plate 351 (shown in FIG. 19) of a box tray assembly 320, the arm 388 continues to rotate, urging the box tray assembly 380 from a first conveyor 382 to a second conveyor 380. Again, the roller wheel 390 is designed to contact the kicker plate 351 of a box tray assembly 381 to push the box tray assembly 381 onto the conveyor 380. Such a system may be used to provide that boxes that are empty or finished being unloaded may be removed (e.g., from conveyor 382), or that boxes that are full or finished being loaded may be removed (e.g., from conveyor 382). The conveyors 380, 382 may also be coplanar, and the system may further include transition roller 383 to facilitate movement of the box tray assembly 381, e.g., by being activated to pull the box tray over to the conveyor 380.

Systems of the invention are highly scalable in terms of sorts-per-hour as well as the number of storage bins and destination bins that may be available. The system provides in a specific embodiment an input system that interfaces to the customer's conveyors and containers, stores objects for feeding into the system, and feeds those objects into the system at a moderate and controllable rate. In one embodiment, the interface to the customer's process takes the form of a dumper from a Gaylord, but many other embodiments are possible. In one embodiment, feeding into the system is by an inclined cleated conveyor with overhead flow restrictors, e.g., baffles. In accordance with certain embodiments, the system feeds objects in at a modest controlled rate. Many options are available, including variations in the conveyor slope and speed, the presence, size and structure of cleats and baffles, and the use of sensors to monitor and control the feed rate.

The system includes in a specific embodiment a primary perception system that monitors the stream of objects on the primary conveyor. Where possible the primary perception system may identify the object to speed or simplify subsequent operations. For example, knowledge of the objects on the primary conveyor may enable the system to make better choices regarding which objects to move to provide a singulated stream of objects.

Figure 22:
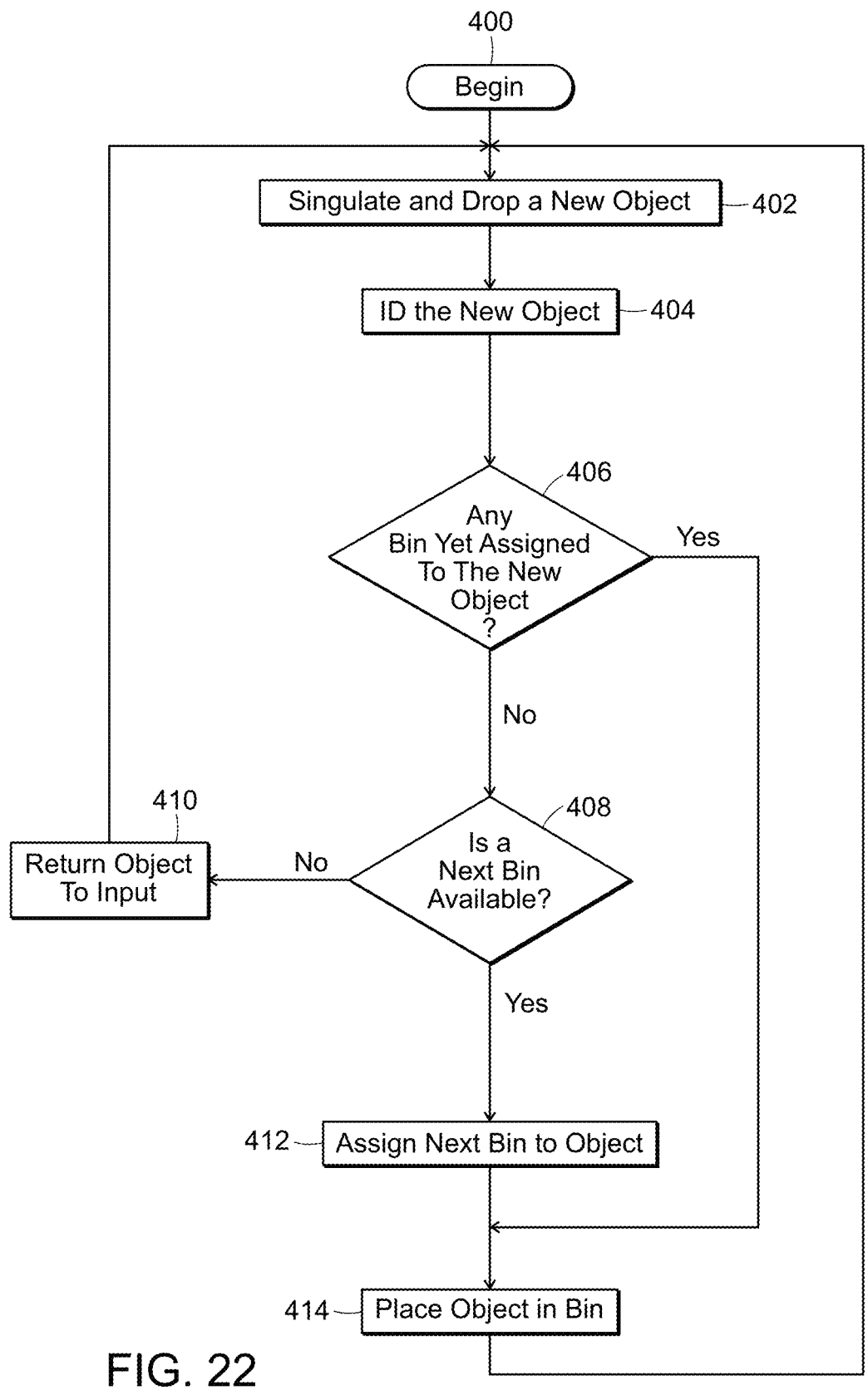
FIG. 22 shows an illustrative diagrammatic view of a flowchart showing selected processing steps in a system in accordance with an embodiment of the present invention.

With reference to FIG. 22, a sortation process of the invention at a sorting station may begin (step 400) by providing a singulated stream of objects that, one at a time, drop an object into the drop scanner (step 402). The system then identifies the new object (step 404). The system then will determine whether the object is yet assigned to any collection bin (step 406). If not, the system will determine whether a next bin is available (step 408). If no next bin is available (step 410), the robotic system will return the object to the input buffer (step 410) and return to step 402. Alternatively, the system can pick one of the collection bins that is in process and decide that it can be emptied to be reused for the object in hand, at which point the control system can empty the collection bin or signal a human worker to do it. If a next bin is available (and the system may permit any number of bins per station), the system will then assign the object to a next bin (step 412). The system then places the object into the assigned bin (step 414). The system then returns to step 402 until finished. Again, in certain embodiments, the secondary conveyor may be an indexed conveyor that moves in increments each time an object is dropped onto the conveyor. The system may then register the identity of the object, access a warehouse manifest, and determine an assigned bin location or assign a new bin location.

Figure 23:
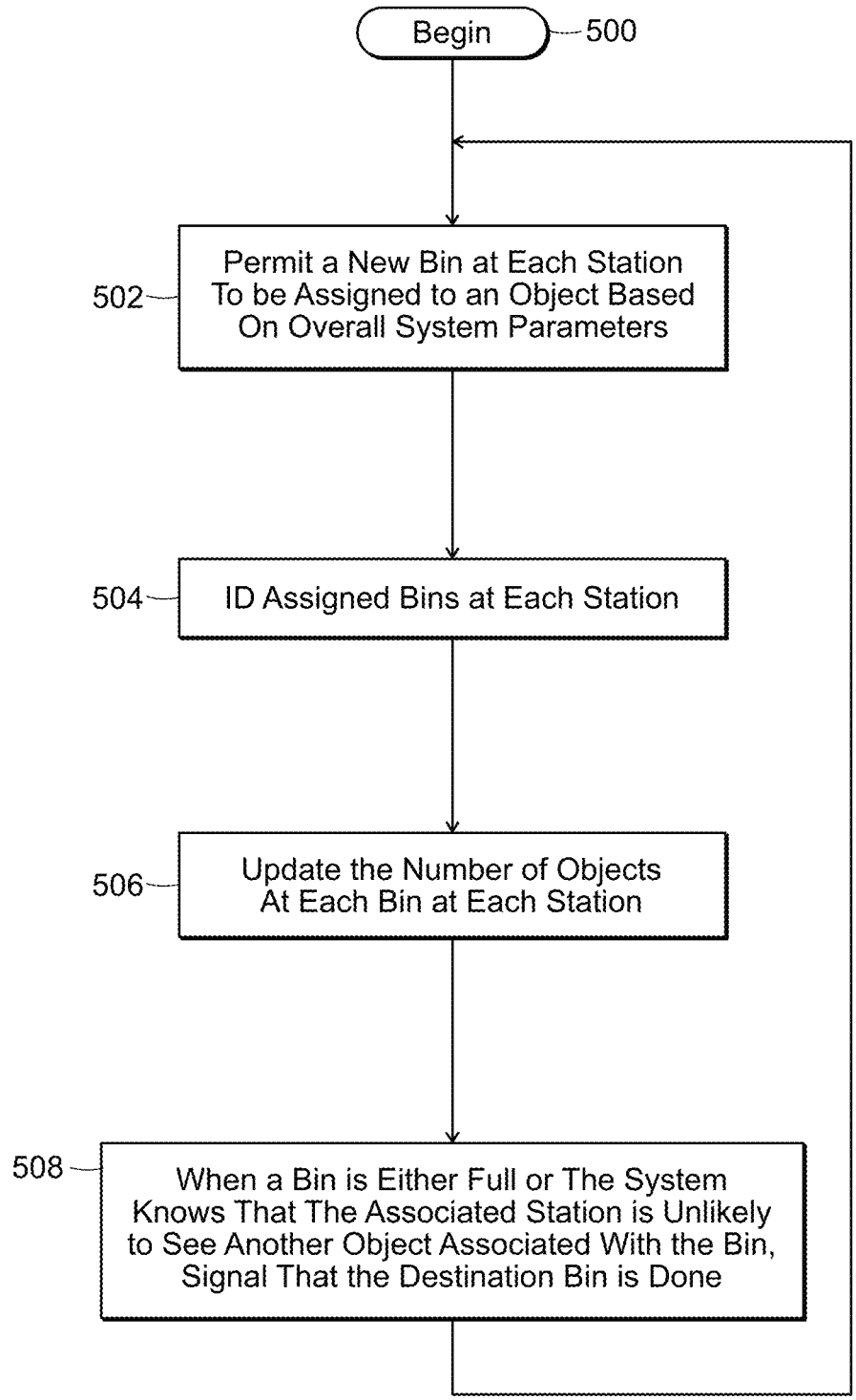
FIG. 23 shows an illustrative diagrammatic view of a flowchart showing bin assignment and management steps in a system in accordance with an embodiment of the present invention.

A process of the overall control system is shown, for example, in FIG. 23. The overall control system may begin (step 500) by permitting a new collection bin at each station to be assigned to a group of objects based on overall system parameters (step 502) as discussed in more detail below. The system then identifies assigned bins correlated with objects at each station (step 504), and updates the number of objects at each bin at each station (step 506). The system then determines that when a bin is either full or the system expects that the associated sorting station is unlikely to see another object associated with the bin, the associated sorting station robotic system will then place the completed bin onto an output conveyor, or signal a human worker to come and empty the bin (step 508), and then return to step 502.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

The operations of the systems described herein are coordinated by the central control system 170 as shown in FIGS. 1 and 3. The central control system is comprised of one or more workstations or central processing units (CPUs). The correspondence between barcodes, for example, and outbound destinations is maintained by the central control system in a database called a manifest. The central control system maintains the manifest by communicating with a warehouse management system (WMS). If the perception system successfully recognizes a marking on the object, then the object is then identified and forwarded to an assigned destination station 130. Again, if the object is not identified, the robotic system may divert the object to a human sortation bin 76 to be reviewed by a human.

Those skilled in the art will appreciate that numerous modification and variations may be made to the above disclosed embodiments without departing from the spirit and scope of the present invention.

What is claimed is:

1. A method of processing objects, said method comprising:
receiving a plurality of objects at an in-feed area at which the plurality of objects may be indiscriminately received at the in-feed area;
lifting a subset of the plurality of objects from the in-feed area using an input conveyance system toward a perception system in an input conveyance vector that includes an input conveyance horizontal direction component and an input conveyance vertical direction component, said input conveyance system including engagement features for engaging the subset of the plurality of objects;
providing a singulated stream of the subset of the plurality of objects;
receiving the singulated stream of the subset of the plurality of objects at a perception system, said perception system being adapted to provide perception data regarding each of the subset of the plurality of objects;
assigning for each of the subset of the plurality of objects a selected destination location of a plurality of destination locations based on the perception data for each of the subset of the plurality of objects;
moving each of the subset of the plurality of objects along a processing conveyance vector that includes a processing horizontal direction component that is generally opposite the input conveyance horizontal direction component; and
diverting each of the subset of the plurality of objects to each selected destination location of the plurality of processing locations in a diverter direction that includes a diverter horizontal direction component that is generally orthogonal to the input conveyance horizontal direction component.

2. The method of claim 1, wherein the in-feed area includes an in-feed conveyor section with side walls to facilitate containing the plurality of objects on the in-feed conveyor section.

3. The method of claim 2, wherein the in-feed conveyor section is a cleated conveyor.

4. The method of claim 1, wherein the input conveyance system includes a cleated conveyor.

5. The method of claim 1, wherein the providing the singulated stream of the subset of the plurality of objects includes using a programmable motion device to individually select each of the subset of the plurality of objects from the in-feed conveyance system.

6. The method of claim 5, wherein the programmable motion device includes an associated in-feed perception system for providing in-feed perception data regarding the subset of the plurality of objects.

7. The method of claim 1, wherein the input conveyance system operates at a speed that is controlled responsive to the in-feed perception data.

8. The method of claim 1, wherein the diverting each of the subset of the plurality of objects to each selected destination location of the plurality of processing locations includes using an orthogonal diverter that diverts each respective object from a destination processing conveyor of the processing conveyance vector along a diverting direction that is generally orthogonal to the input conveyance horizontal direction component.

9. The method of claim 8, wherein a return selected destination of the plurality of destination locations is the input area such that a return object of the subset of the plurality of objects may be returned from the destination processing conveyor to the input area.

10. The method of claim 8, wherein each of the plurality of destination locations may be dynamically assigned to each of the subset of the plurality of objects.

11. A method of processing objects, said method comprising:
receiving a plurality of objects at an in-feed area at which the plurality of objects may be indiscriminately received at the in-feed area;
lifting a subset of the plurality of objects from the in-feed area using an input conveyance system toward a perception system in an input conveyance vector that includes an input conveyance horizontal direction component and an input conveyance vertical direction component, said input conveyance system including engagement features for engaging the subset of the plurality of objects;
receiving the subset of the plurality of objects at a perception system, said perception system being adapted to provide perception data regarding each of the subset of the plurality of objects;

assigning for each of the subset of the plurality of objects a selected destination location of a plurality of destination locations based on the perception data for each of the subset of the plurality of objects;

moving each of the subset of the plurality of objects in a singulated stream of the subset of the plurality of objects along a processing conveyance vector that includes a processing horizontal direction component that is generally opposite the input conveyance horizontal direction component;

diverting each of the subset of the plurality of objects to each selected destination location of the plurality of processing locations in a diverter direction that includes a diverter horizontal direction component that is generally orthogonal to the input conveyance horizontal direction component; and receiving each of the subset of the plurality of objects at each respective destination location.

12. The method of claim 11, wherein the in-feed area includes an in-feed conveyor section with side walls to facilitate containing the plurality of objects on the in-feed conveyor section.

13. The method of claim 12, wherein the in-feed conveyor section is a cleated conveyor.

14. The method of claim 11, wherein the input conveyance system includes a cleated conveyor.

15. The method of claim 11, wherein the receiving the subset of the plurality of objects from the perception system includes using a programmable motion device to individually select each of the subset of the plurality of objects from the input conveyance system and provide them to the perception system.

16. The method of claim 15, wherein the programmable motion device includes an associated in-feed perception system for providing in-feed perception data regarding the subset of the plurality of objects.

17. The method of claim 11, wherein the input conveyance system operates at a speed that is controlled responsive to the in-feed perception data.

18. The method of claim 11, wherein the diverting each of the subset of the plurality of objects to each selected destination location of the plurality of processing locations includes using an orthogonal diverter that diverts each respective object from a destination processing conveyor of the processing conveyance vector along a diverting direction that is generally orthogonal to the input conveyance horizontal direction component.

19. The method of claim 18, wherein a return selected destination of the plurality of destination locations is the input area such that a return object of the subset of the plurality of objects may be returned from the destination processing conveyor to the input area.

20. The method of claim 18, wherein each of the plurality of destination locations may be dynamically assigned to each of the subset of the plurality of objects.

21. An object processing system comprising:
an in-feed area at which a plurality of objects may be indiscriminately received, said in-feed area including at least one wall for facilitating retaining the plurality of objects at the in-feed area;
an input conveyance system for lifting a subset of the plurality of objects from the in-feed area toward a perception system in an input conveyance vector that includes an input conveyance horizontal direction component and an input conveyance vertical direction component, said input conveyance system including engagement features for engaging the subset of the plurality of objects;
a perception system for receiving the subset of the plurality of objects and for providing perception data regarding each of the subset of the plurality of objects;
a control system for assigning each of the subset of the plurality of objects a selected destination location of a plurality of destination locations based on the perception data for each of the subset of the plurality of objects;
a processing conveyor for moving each of the subset of the plurality of objects along a processing conveyance vector that includes a processing horizontal direction component that is generally opposite the input conveyance horizontal direction component; and
a plurality of diverters for diverting the each of the subset of the plurality of objects to each selected destination location of the plurality of processing locations in a diverter direction that includes a diverter horizontal direction component that is generally orthogonal to the input conveyance horizontal direction component.

22. The object processing system of claim 21, wherein the at least one wall at the in-feed area is one of two walls on either side of an in-feed conveyor section.

23. The object processing system of claim 22, wherein the in-feed conveyor section is a cleated conveyor.

24. The object processing system of claim 21, wherein the input conveyance system includes a cleated conveyor.

25. The object processing system of claim 21, wherein the object processing system further includes a programmable motion device for individually selecting each of the subset of the plurality of objects from the input conveyance system and providing them to the perception system.

26. The object processing system of claim 25, wherein the programmable motion device includes an associated in-feed perception system for providing in-feed perception data regarding the subset of the plurality of objects.

27. The object processing system of claim 21, wherein the input conveyance system operates at a speed that is controlled responsive to the in-feed perception data.

28. The object processing system of claim 21, wherein each of the plurality of diverters divert each of the subset of the plurality of objects to each selected destination location of the plurality of processing locations is an orthogonal diverter that diverts each respective object from a destination processing conveyor of the processing conveyance vector along a diverting direction that is generally orthogonal to the input conveyance horizontal direction component.

29. The object processing system of claim 28, wherein a return selected destination of the plurality of destination locations is the input area such that a return object of the subset of the plurality of objects may be returned from the destination processing conveyor to the input area.

30. The object processing system of claim 28, wherein each of the plurality of destination locations may be dynamically assigned to each of the subset of the plurality of objects.

* * * * *